United States Patent [19]

Gastinel

[11] 4,328,557

[45] May 4, 1982

[54] PROCESSOR CIRCUIT FOR VIDEO DATA TERMINAL

[75] Inventor: Jean Gastinel, Paris, France

[73] Assignee: Thomson-CSF, Paris, France

[21] Appl. No.: 152,888

[22] Filed: May 23, 1980

Related U.S. Application Data

[63] Continuation of Ser. No. 879,974, Feb. 22, 1978, abandoned.

[30] Foreign Application Priority Data

Feb. 23, 1977 [FR] France ............................... 77 05254

[51] Int. Cl.³ ............................................ G06F 3/153

[52] U.S. Cl. .................................... 364/900; 340/750; 340/799

[58] Field of Search ... 364/200 MS File, 900 MS File; 358/85, 903; 340/720, 724, 725, 748, 799; 179/2 TV

[56] References Cited

U.S. PATENT DOCUMENTS

| | | | |
|---|---|---|---|
| 3,593,310 | 7/1971 | Kievit | 364/900 |
| 3,654,611 | 4/1972 | Bluethman et al. | 364/200 |
| 3,706,075 | 12/1972 | Fredrickson et al. | 364/900 |
| 3,786,429 | 1/1974 | Goldman et al. | 364/900 |
| 3,810,107 | 5/1974 | Goldman et al. | 364/200 |
| 3,822,363 | 7/1974 | Moyer et al. | 340/748 X |
| 3,848,232 | 11/1974 | Leibler et al. | 364/200 |
| 3,984,638 | 10/1976 | Carrouge | 179/2 TV X |
| 4,057,849 | 11/1977 | Ying et al. | 364/200 |
| 4,070,710 | 1/1978 | Sukonick et al. | 340/724 X |
| 4,071,910 | 1/1978 | Stockebrand et al. | 364/900 |

*Primary Examiner*—Gareth D. Shaw
*Assistant Examiner*—Thomas M. Heckler
*Attorney, Agent, or Firm*—Edwin E. Greigg

[57] ABSTRACT

An electronic data processor, for use with a keyboard, a telephone set and a standard television receiver, for permitting the exchange of data with an information system. The electronic processor includes circuitry for displaying pages of alphanumeric text on the television screen, either block by block or in continuous manner, circuitry for generating and displaying a writing cursor which indicates the position of the letter which is to be written or changed, circuitry for erasing parts or all of the screen and all of these circuits being so connected as to operate in time-shared manner with the line scan frequency of the television receiver.

15 Claims, 33 Drawing Figures

| Pi | P3 | P2 | P1 | P0 | R2 | R1 | R0 |
|---|---|---|---|---|---|---|---|
| 0 | 0 | 0 | 0 | 0 | 0 | 0 | 0 |
| 1 | 0 | 0 | 0 | 1 | 0 | 0 | 1 |
| 2 | 0 | 0 | 1 | 0 | 0 | 1 | 0 |
| 3 | 0 | 0 | 1 | 1 | 0 | 1 | 1 |
| 4 | 0 | 1 | 1 | 0 | 1 | 1 | 0 |
| 5 | 0 | 1 | 0 | 1 | 1 | 0 | 1 |
| 6 | 0 | 1 | 0 | 0 | 1 | 0 | 0 |
| 7 | 0 | 1 | 1 | 1 | 1 | 1 | 1 |
| 8 | 1 | 0 | 1 | 0 | 0 | 0 | 0 |
| 9 | 1 | 0 | 0 | 1 | 0 | 0 | 0 |
| 10 | 1 | 0 | 0 | 0 | 0 | 0 | 0 |
| 11 | 1 | 0 | 1 | 1 | 0 | 0 | 0 |
| 0 | 0 | 0 | 0 | 0 | 0 | 0 | 0 |

Fig_14-a

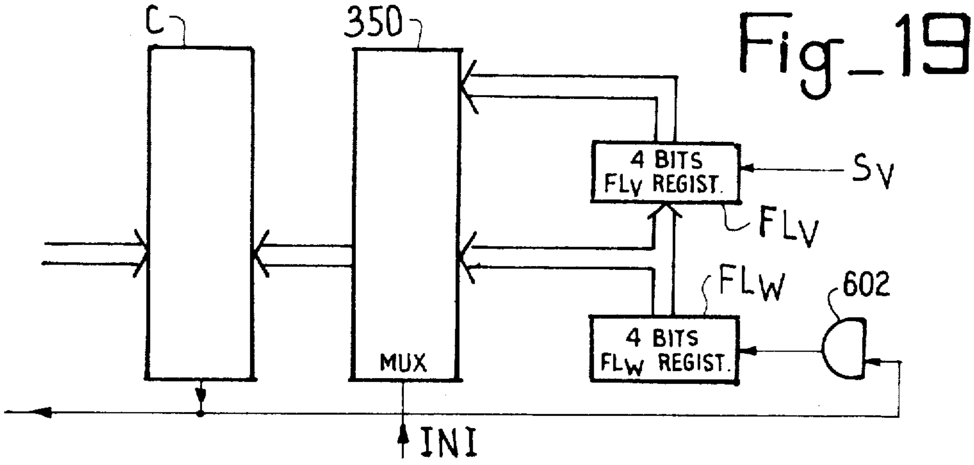
Fig_19
Fig_20
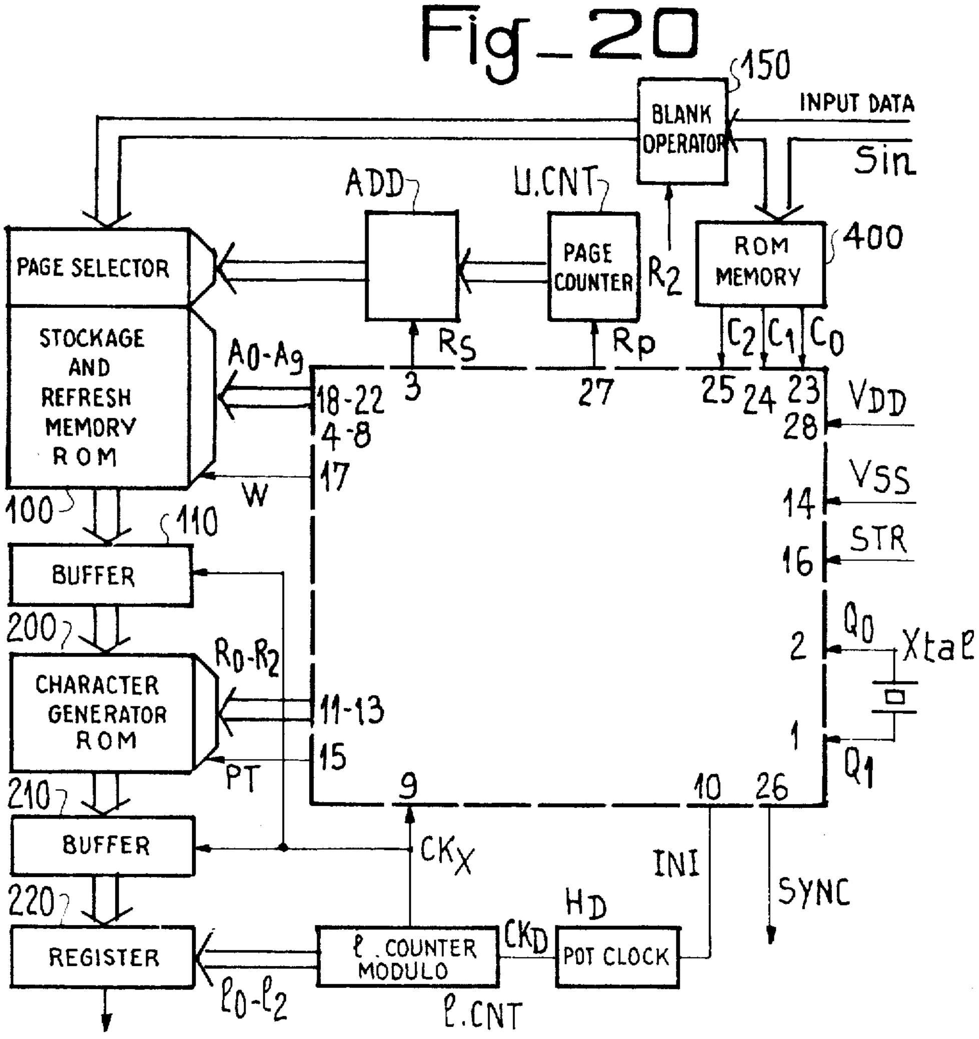

PROCESSOR CIRCUIT FOR VIDEO DATA TERMINAL

This is a continuation of application Ser. No. 879,974, filed Feb. 22, 1978, abandoned.

BACKGROUND OF THE INVENTION

The invention relates to data display terminals, in particular video terminals for the visual display of information on a cathode ray tube. Video terminals of the type to which this invention relates may be used by a person to communicate, for example with a computer located at some distance via data communication lines, for example commercial telephone lines. The invention relates particularly to a video terminal which employs as its display device a television receiver.

Known data terminals usually include a console with some type of cathode ray screen, a keyboard for writing various messages, commands and other control information and may have an acoustical coupler which permits the transfer of information to and from the data terminal via commercial telephone lines. The acoustic coupler normally accepts the handset portion of a standard telephone set permitting the acoustical exchange of signals with the telephone set. The type of data terminal referred to above has a large number of applications, among which are the interrogation of an interaction with data banks, the transmission and exchange of communication, the dialogue with a computer, process control and numerous others. Generally, it is desirable if these data terminals are easily transported but they may also be permanently installed.

While there appears to be a universal utility for these data terminals, their general use in public is still limited because of the relatively high cost of acquisition. In order to lower the overall cost of this type of equipment, it has been proposed to employ as the visual display device a commercial television receiver for displaying written text and graphical symbols. Ordinary television receivers are produced in vast numbers and are generally accessible to any potential user of data terminals.

Inasmuch as the majority of potential users thus has access or possession of a television set and normally can make use of a standard telephone set and because the keyboard itself is not a very high-priced item, it would be possible to considerably lower the cost of a data terminal if an electronic processor were designed which would appropriately combine the functions of these various elements to produce a data video terminal which has high flexibility for handling various types of data. Two principal concepts stand out for use in the general area of performing the required processing tasks on a data terminal. The first of these makes use of universal microprocessors, generally known under the acronyms M.P.U., C.P.U., etc. Such microprocessors may be coupled with standard components and can be programmed, thereby giving the system in which they are used a great deal of flexibility but incurring a substantial cost. The second concept aims at providing a specialized processor for a particular application. Such a processor is constructed by judicious combination of circuit elements which may include those of medium scale integration (M.S.I.) so that the overall flexibility and performance of the processor is limited but the attendant cost is reduced. The present invention differs from these two concepts in that it describes a method and means for producing a specialized processor of high flexibility and capability associated with a limited number of standard M.S.I. components and capable of performing the required functions to permit a very flexible system for communication by means of a video screen. Furthermore, the circuitry according to the invention is capable of being included in a large scale integration processor in a single integrated circuit block.

OBJECT AND SUMMARY OF THE INVENTION

It is thus a principal object of the present invention to describe an electronic processor suitable for large scale integration and capable of association with a commercial television receiver and a standard electronic keyboard as well as a telephone set. It is a second object of the present invention to provide an electronic processor of the above-described type which coordinates the functions of the video display, the keyboard and the telephone set in a general manner, permitting the receipt and sending of coded messages such as in codes commonly known as ASCII, EBDIC, BAUDOT, etc. It is a further object of the invention to thus provide a video data terminal which has high performance but whose acquisition cost and usage costs are relatively low. Furthermore it is an object of the invention to provide a data terminal which can be easily transported and has a large number of optional features which permit its use by a very general segment of the populace.

The processing circuit according to the present invention accomplishes the following principal tasks:

1. Coding and decoding of signals from an external source of coded messages,
2. Classification of coded messages according to their nature, i.e. characters, control signals, and commands,
3. Storage of messages,
4. Display of characters on a cathode ray tube (CRT) to form a readable text.

The display functions of the data terminal include the following:

Displaying a relatively high number of characters for each line of text and a relatively large number of lines of text per page;

To display texts at a high refreshment rate without flickering;

To display a blinking writing cursor which can be displaced to any part of the screen;

To handle a large number of text pages, either singly or catenated in continuous manner;

Automatic scrolling, i.e. roll-up of the next page of text;

Partial or complete erasure of rows of characters displayed on the screen.

A particular feature of the present invention is that its prinicpal functions, i.e. the writing in memory and the reading/display are performed in time-share with the line sweep cycle of the television receiver, thereby permitting a high rate of information flow.

It is another characteristic feature of the invention that the time base which conrols the television sweep rate and the display time rate for the text characters are pseudosynchronous, making it possible to arbitrarily alter the size of the displayed characters.

A still further feature of the invention is that the processor can include random access memories (RAM), of either static or dynamic type. When dynamic memories are used, the processor permits the refreshing of the characters stored in memory.

Yet another characteristic of the invention is that the architecture of the processor is such as to permit large scale integration (LSI), due especially to the choice of the logical circuits and the small number of input/output lines.

The invention will be better understood as well as further objects and advantages thereof become more apparent from the ensuing detailed description of a preferred exemplary embodiment of the invention taken in conjunction with the drawing.

Figure 4:
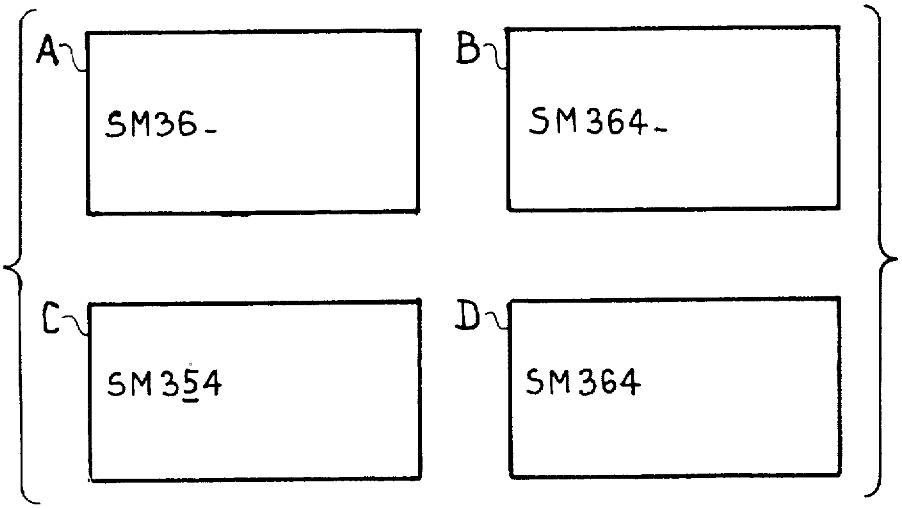
Figure 5:
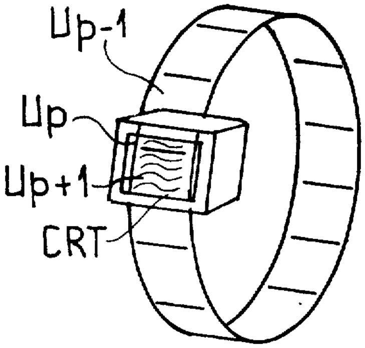
Figure 6:
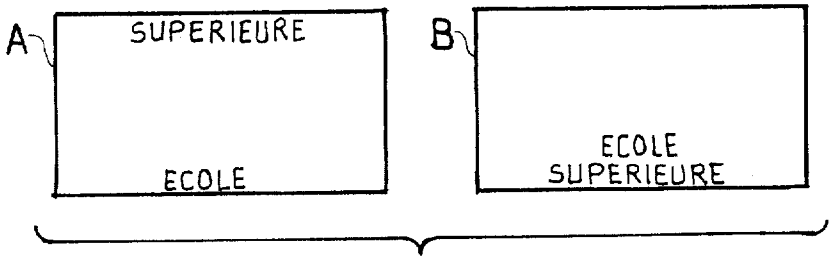
Figure 7:
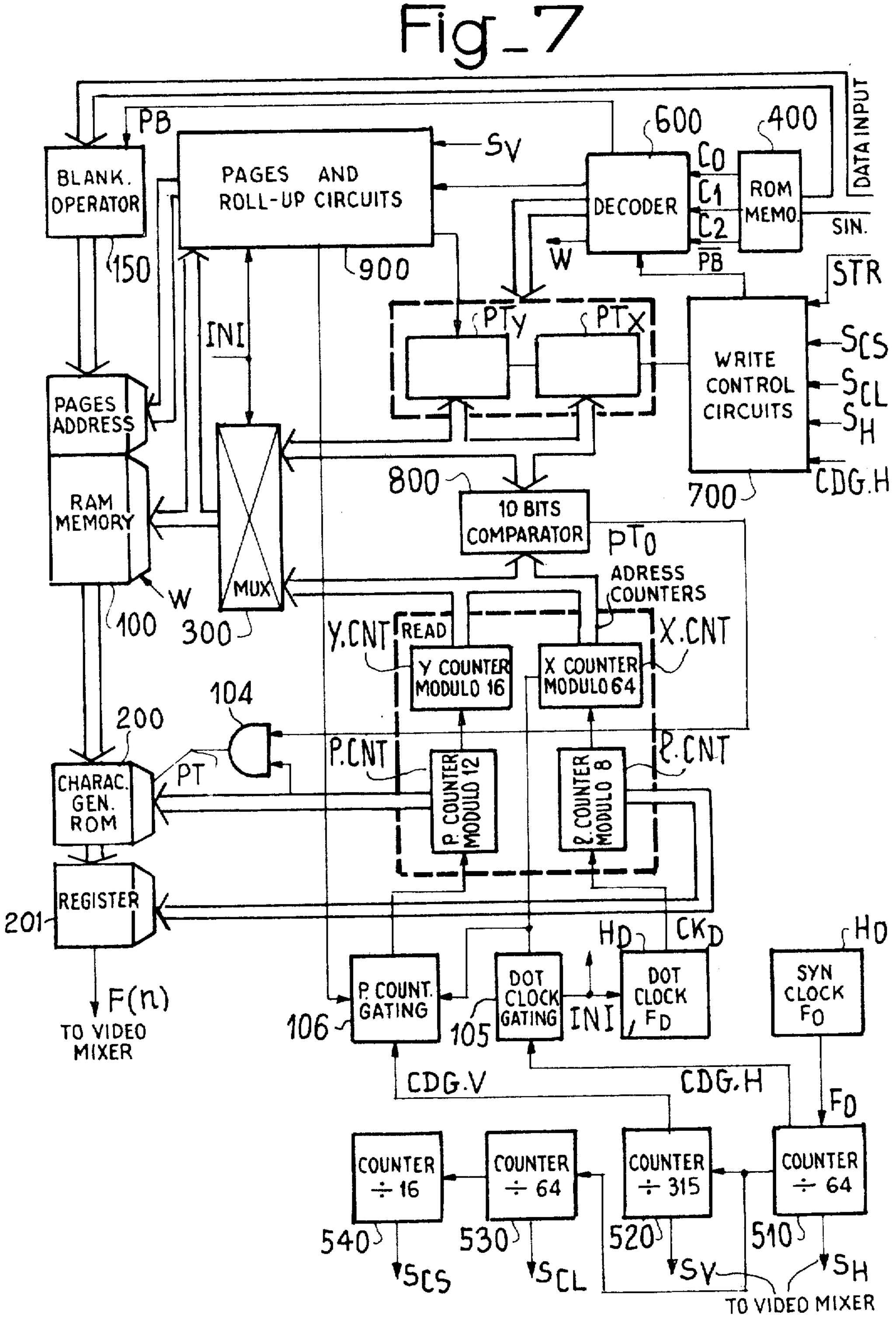
Figure 8A:
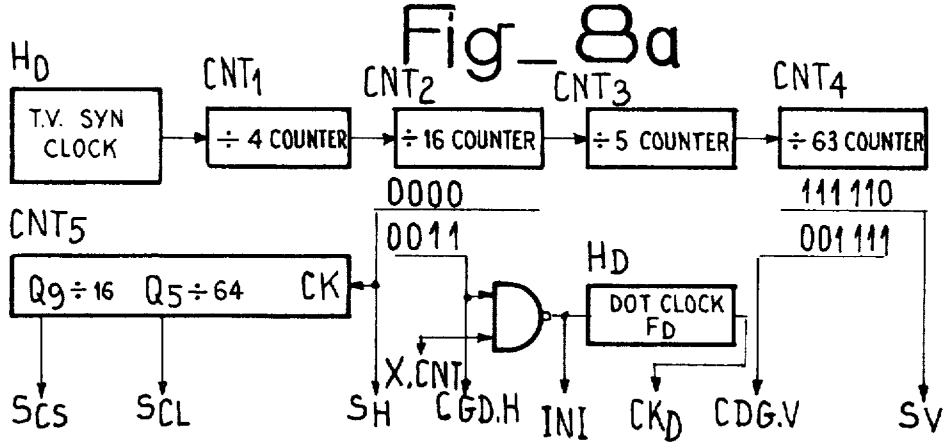
Figure 8B:
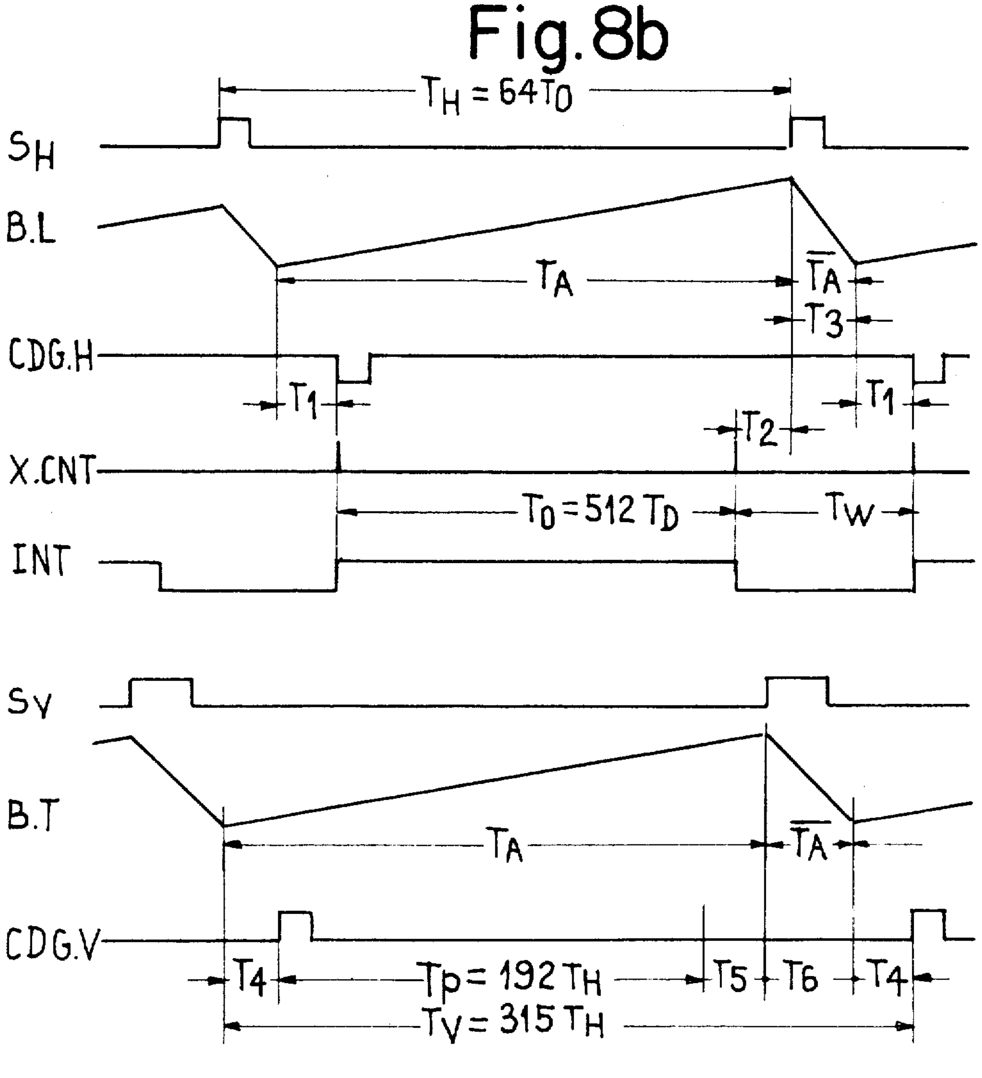
Figure 10:
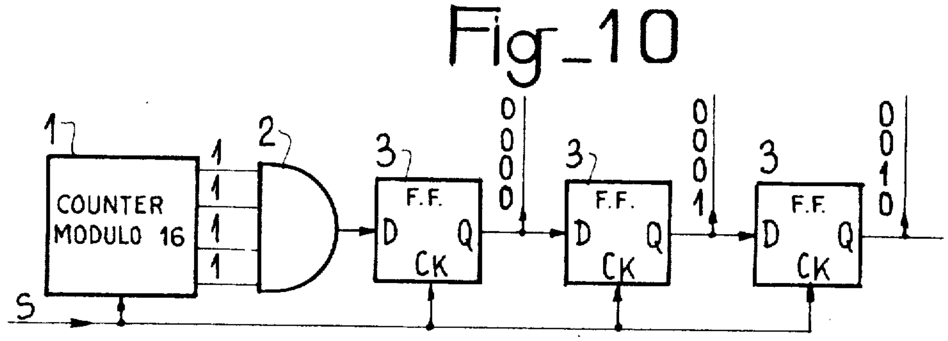
Figure 12:
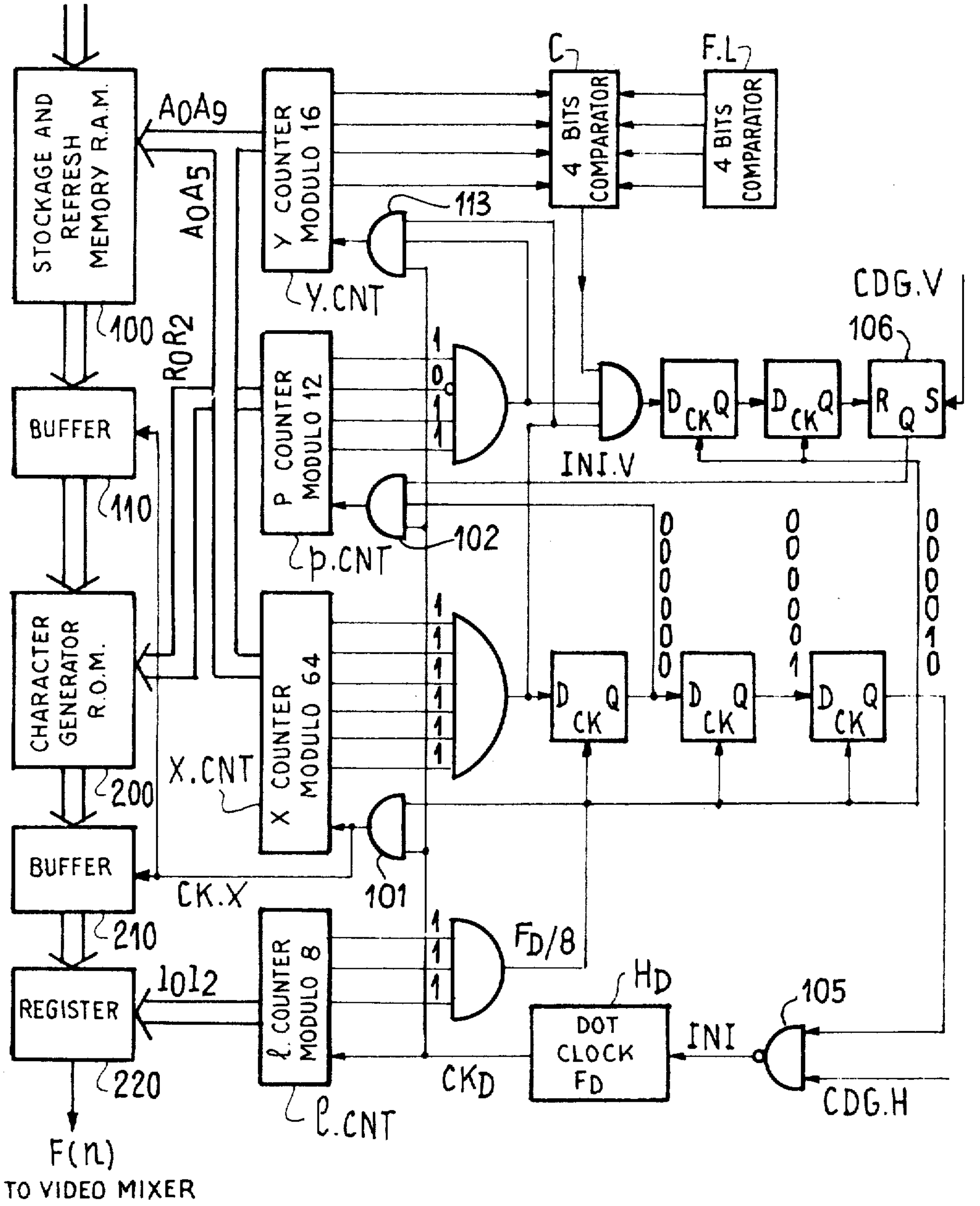
Figure 13:
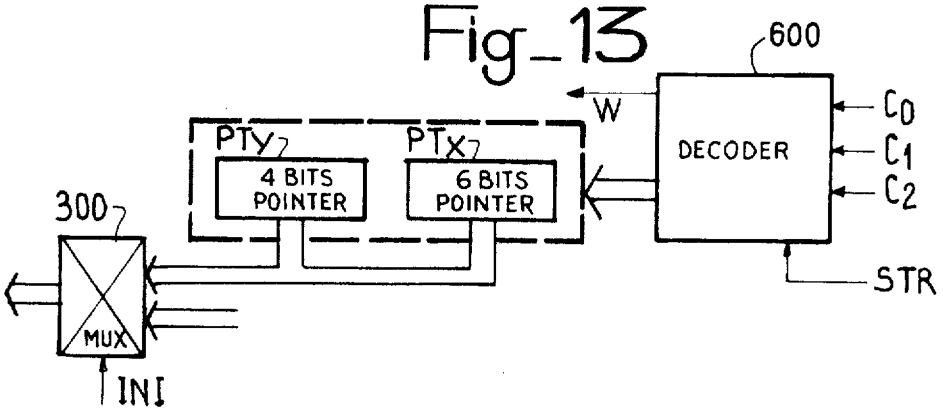
Figure 13:
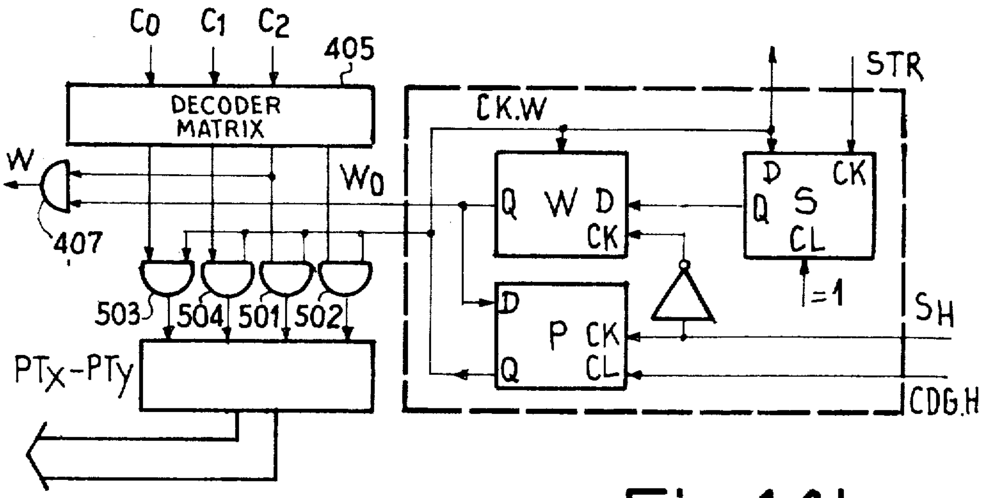
Figure 14B:
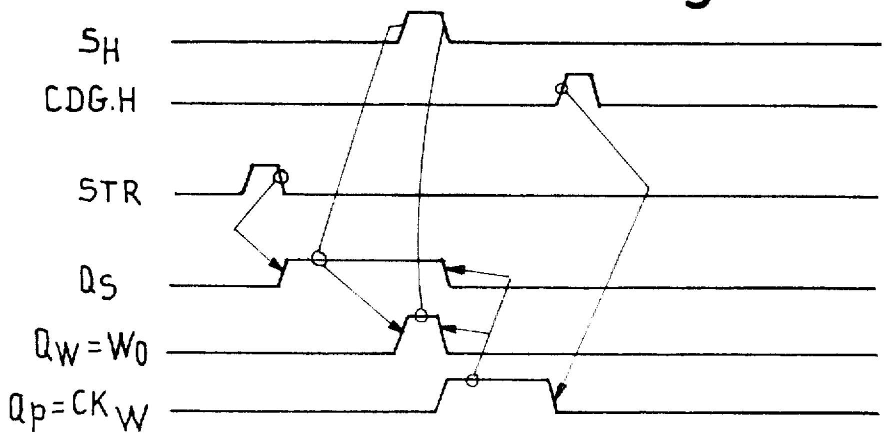
Figure 15:
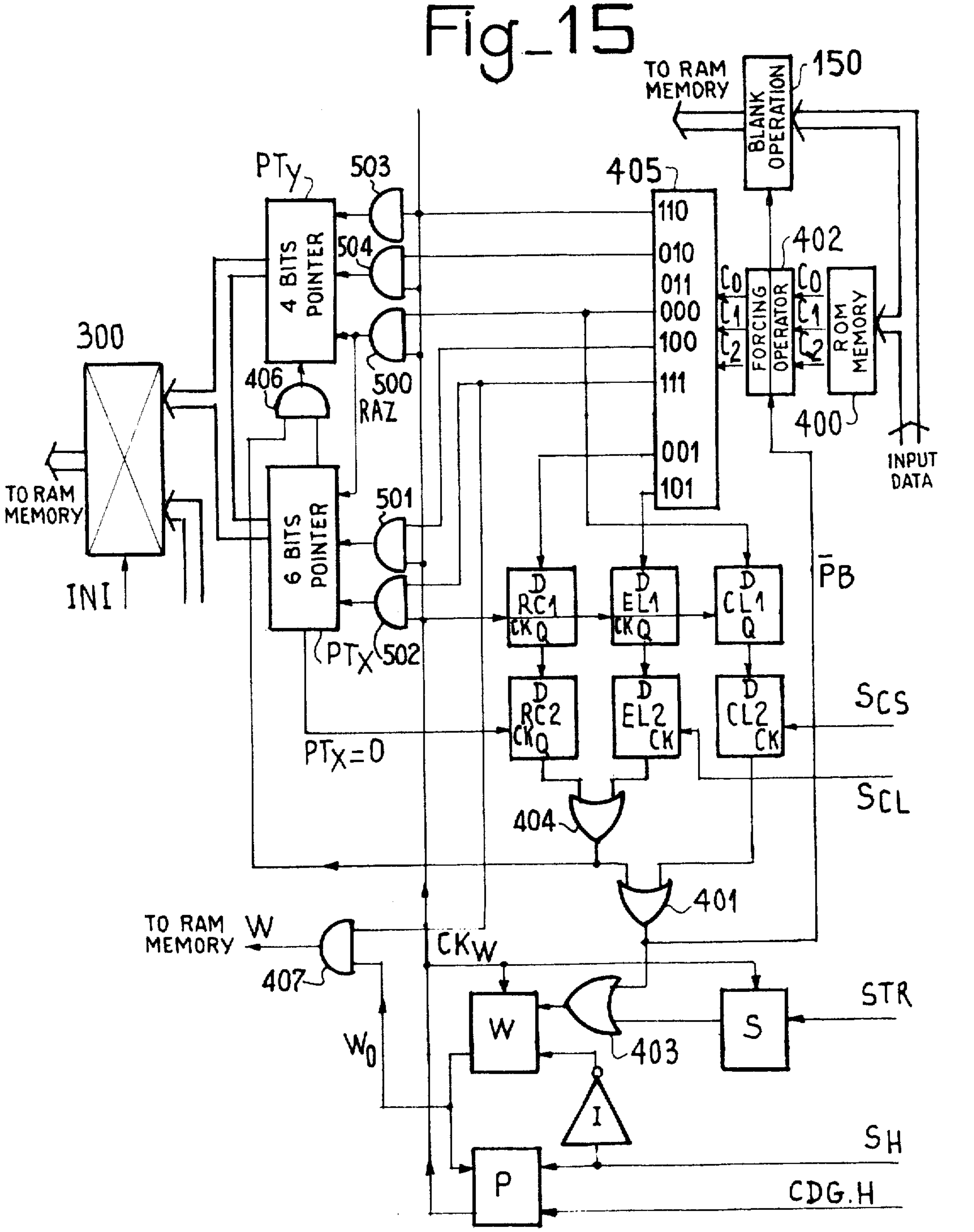
Figure 16:
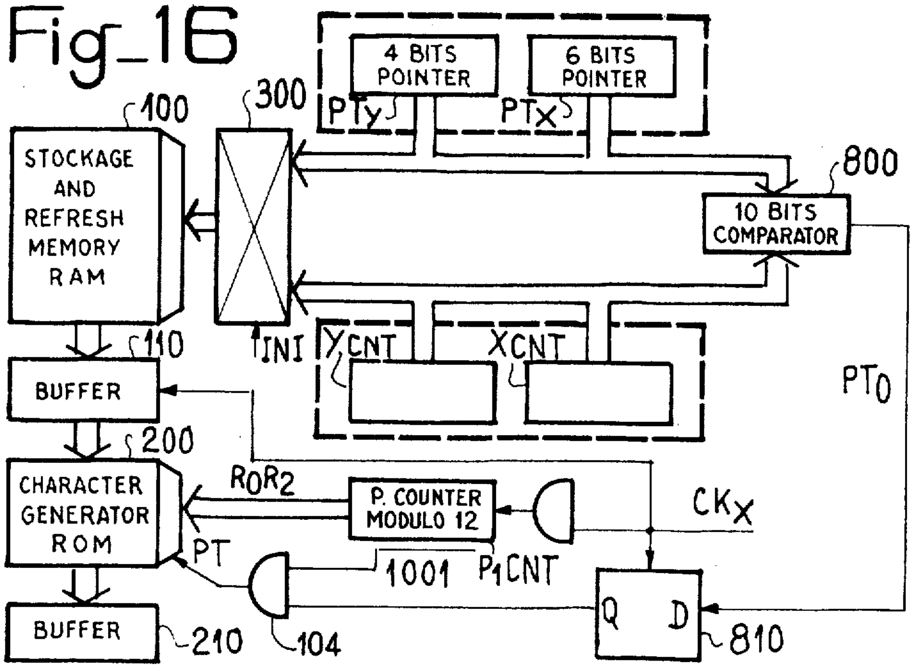
Figure 17:
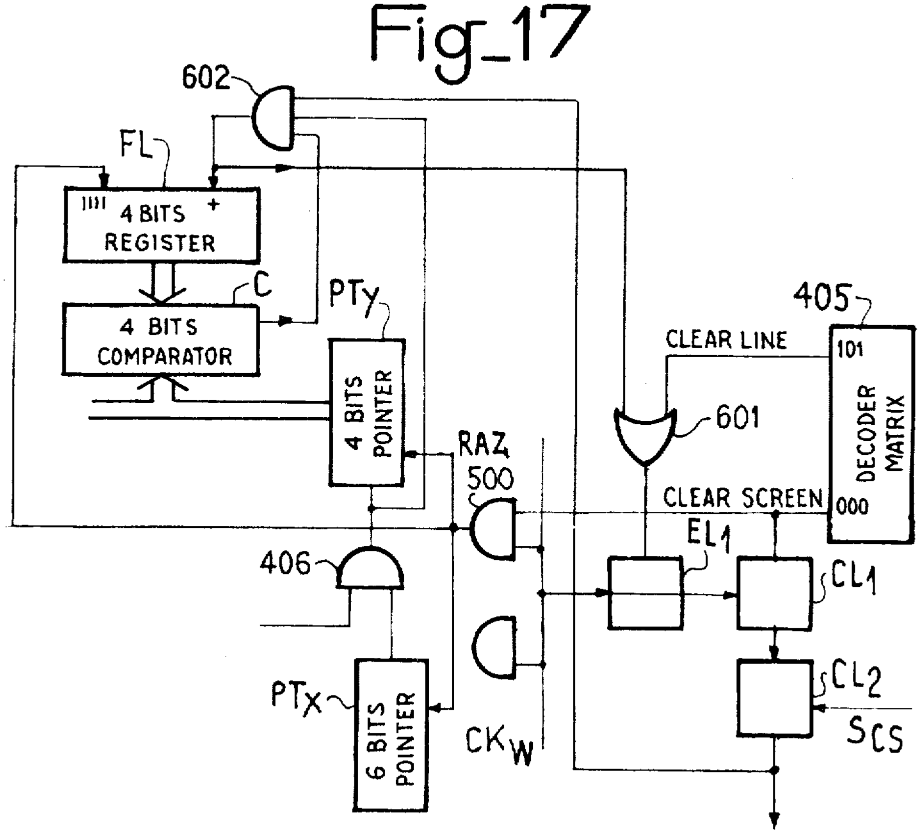
Figure 18A:
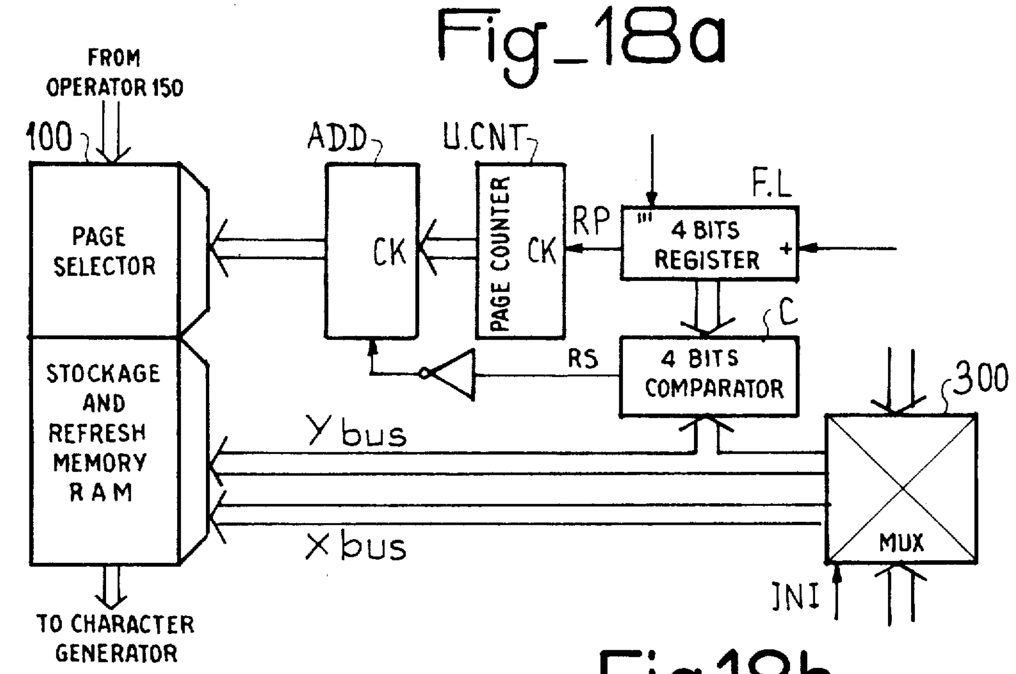
Figure 18B:
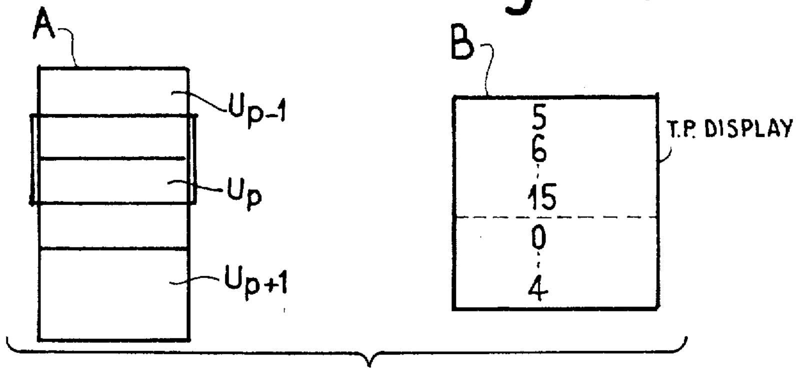
Figure 18C:
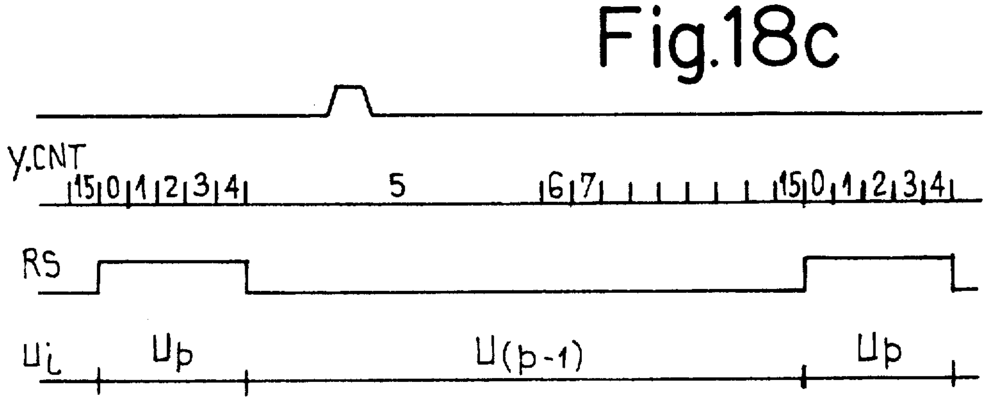
Figure 21:
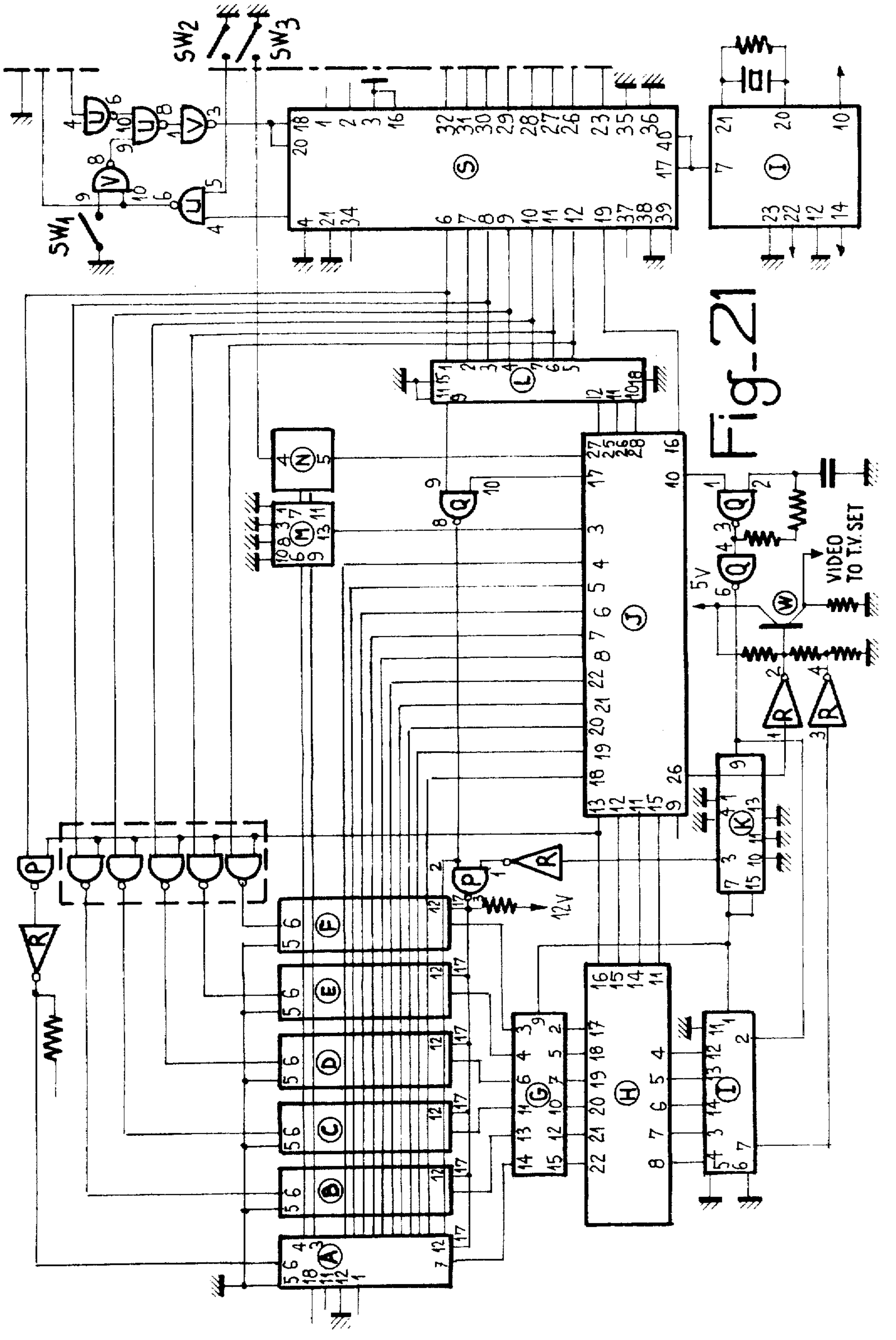

FIGS. *3a* and *3b* are diagrams illustrating the formatting of the text displayed on the cathode ray tube;

FIG. 4 illustrates the manner in which the writing cursor operates;

FIG. 5 is an illustration to aid the description of page concatenation;

FIG. 6 is a diagram illustrating page scrolling;

FIG. 7 is a detailed block diagram illustrating the processor architecture in terms of functional blocks;

FIGS. 8*a* and 8b are illustrations of the time base generators and of the timing diagrams associated therewith;

FIGS. 9*a* through 9*e* illustrate the memory address circuits in the read/display mode;

FIG. 10 is a logical circuit diagram of a temporal detection circuit;

FIG. 11, consisting of a and b, is an illustration of the part of the processor producing page movement;

FIG. 12 is an illustrtion of circuitry providing address generation;

FIG. 13 is a simplified illustration of address circuits for the writing means;

FIG. 14*a* illustrates circuitry which generates a simple writing cycle; FIG. 14*b* is an associated timing diagram;

FIG. 15 illustrates circuit elements for generating complex writing cycles;

FIG. 16 illustrates circuit elements for generating and displaying the writing cursor;

FIG. 17 is an illustration of elements for moving the text on the screen;

FIGS 18*a* and 18*b* are illustrations of circuitry for joining pages of text indicating the manner of concatenation; FIG. 18*c* is a timing diagram of associated signals;

FIG. 19 is a variant embodiment of the manner of moving a page of text;

FIG. 20 is an illustrative description of the architecture of the integrated processor; and FIG. 21 is an overall diagram illustrating an example of the application of a processor according to the invention.

DESCRIPTION OF THE PREFERRED EMBODIMENT

Figure 1:
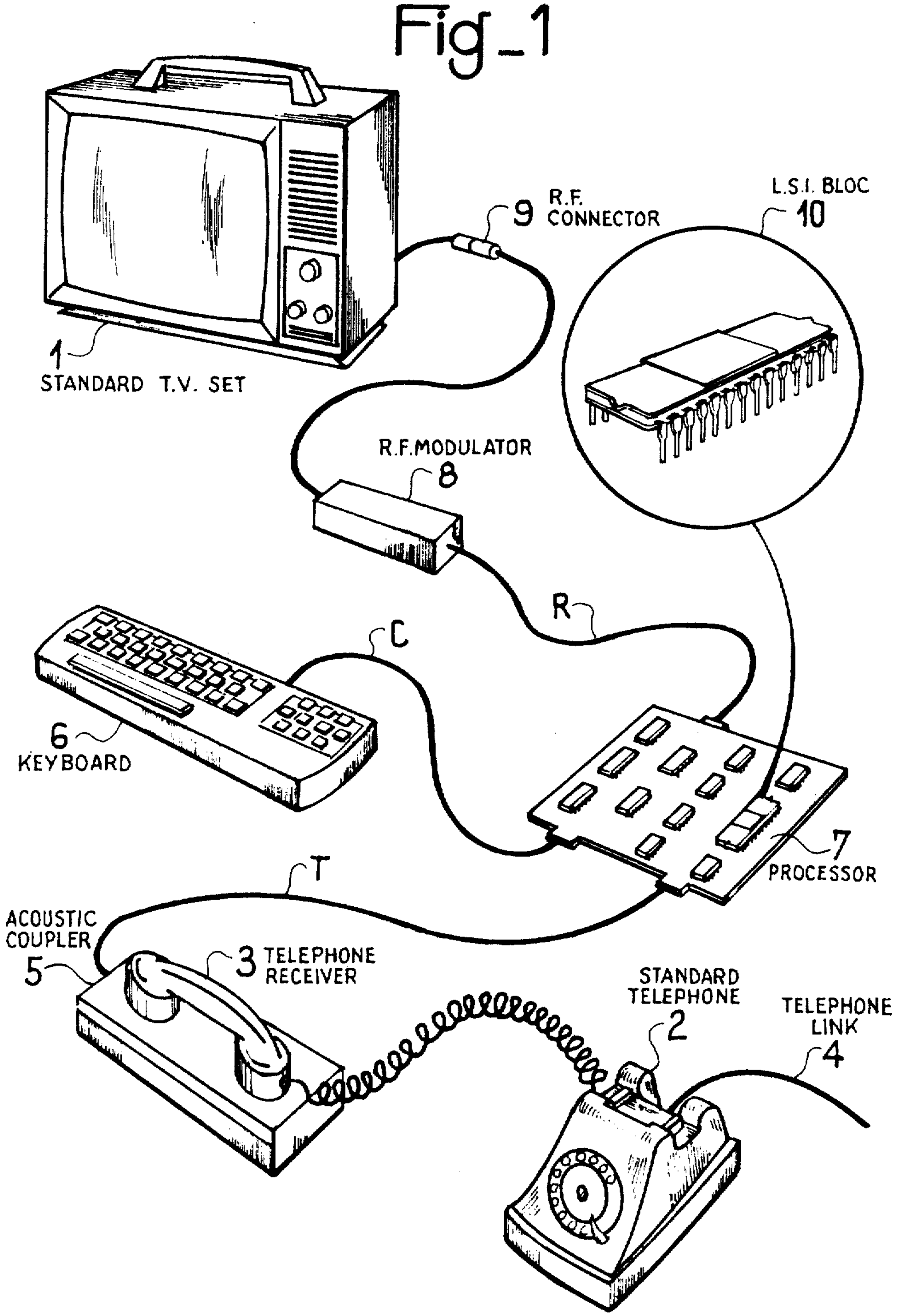
FIG. 1 is an illustration showing the various elements associated with the processor of the invention to provide a video terminal.

Turning now to FIG. 1, there will be seen an overall illustration of the various elements which cooperate to form a data display terminal according to the present invention. The terminal includes or is associated with the following major components:

A standard television receiver 1 of any commercial design, either black-and white or color. The TV set serves for the display on its screen of various characters, letters, numerals, punctuation signs and other symbols. The size of the cathode ray tube is entirely determined by the convenience of the user, i.e. by the distance at which the TV screen is normally placed from the keyboard. Further considerations may be whether the terminal is fixed or mobile and if it is to be supplied by battery power or by line power.

A standard subscriber telephone set 2 having a handset 3 with a speaker and a microphone connected by a cable 4 to the telephone network.

An acoustic coupler 5 permitting communication between the telephone set 3 and the electronic processor 7. The presence of the coupler 5 is optional if the processor is directly connected to the telephone or to the system with which the user wishes to communicate.

A standard keyboard 6 having, for example 52 keys and including coding electronics. The keyboard serves to edit the text and to provide commands to the processor.

A processor 7, shown here as a single circuit board which is connected to the other elements of the terminal by a cable R which leads to the television receiver 1. The cable includes a UHF modulator 8 and a coaxial antenna coupling 9. A cable C connects the keyboard to the processor, while a cable T connects the processor to the telephone assembly. If the television receiver 1 is of the type which has a direct video input or if its place is taken by a standard display terminal, such as a professional video monitor operating at commercial television norms, the UHF modulator 8 may be omitted.

The terminal according to the present invention may have other configurations, in particular it may include several cathode ray tubes, the addition of a luminous writing wand, a printing mechanism, etc.

Figure 2:
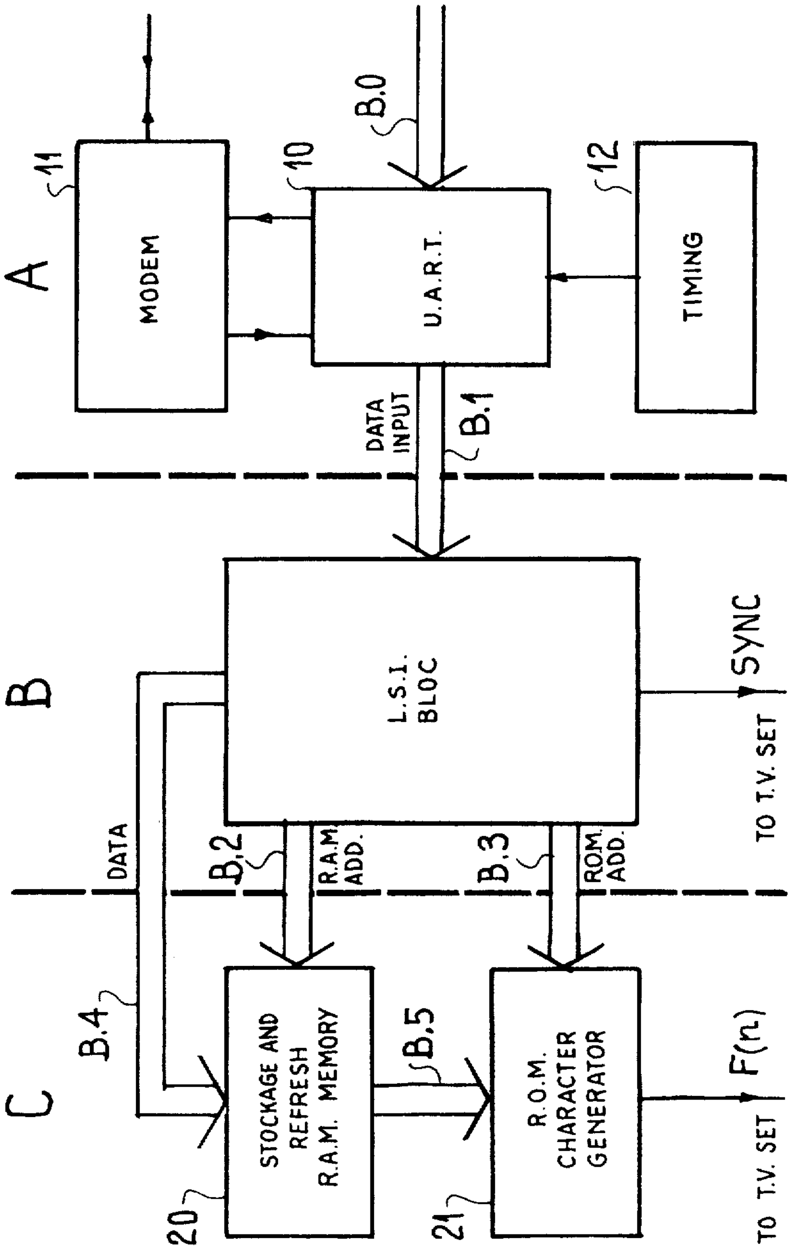
FIG. 2A–C are block diagrams illustrating the major sub-assemblies of the processor portion of the invention.

FIG. 2 is an overall block diagram of the major sub-assemblies of the processor 7 in FIG. 1. It will be seen that the processor comprises three major parts:

The first part A includes a UART for placing in parallel or in series data received on the entry/exit buses. The UART may be of the type AY-5-1013, marketed by the firm General Instruments Company and it receives, for example, messages produced by the keyboard and is associated with a sending and receiving modem 11, for example an integrated circuit of the type MC 14412 marketed by the firm Motorola as well as with a clock circuit 12, for example an integrated circuit of the type MC 14411 marketed by the firm Motorola. The second major subassembly of the processor is the part B which includes processing circuits for various signals and which will be described in greater detail below.

The third major sub-assembly of the processor 7 is the part C which includes a memory 20 for storing character codes in binary form and a character generator 21.

With the exception of a small number of standard components, the part B of the processor is a single package such as that labeled 10 in FIG. 1.

The major connections between the sub-assemblies are the following:

The output bus Bo from the keyboard, the input bus B1 for coded messages into the processor, the address bus B2 for the charcter memory 20, the address B3 for the character generator 21, the data input bus B4 for the character memory 20, the connection B5 between the memory 20 and the character generator.

The major output signals from the processor are these:

The video signal F(n) for displaying characters on the CRT,

The synchronization signal (SYNC) for the sweep of the CRT.

Figure 3A:
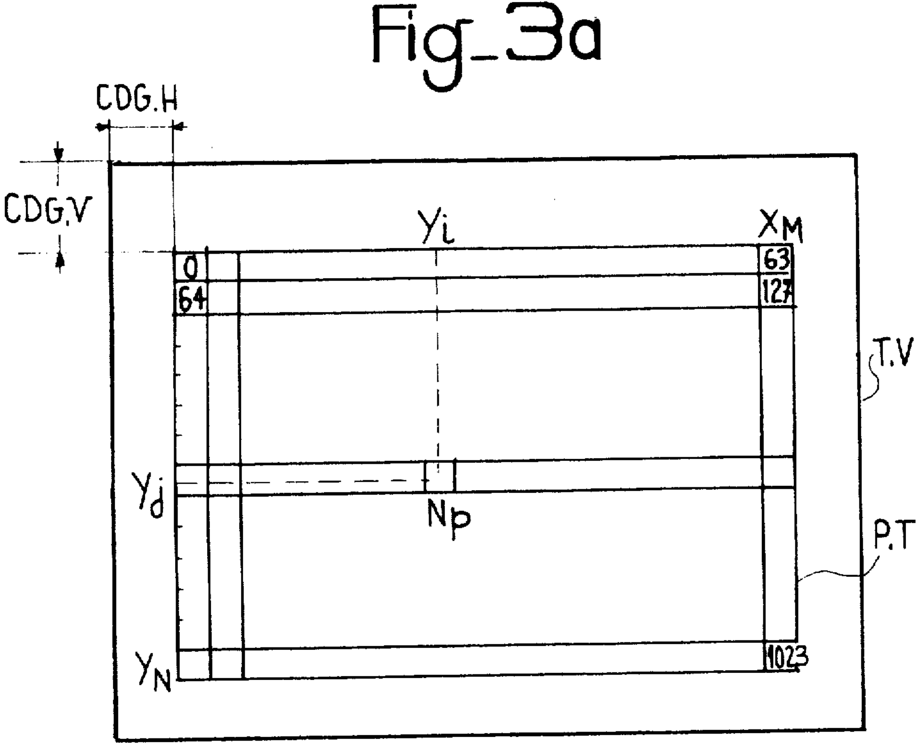

Before proceeding to the complete and detailed description of the apparatus of the invention, the nature and characteristics of the text displayed on the CRT will be explained with a definition of the various terms used in the following description. Turning therefore to FIG. 3, there will be seen a diagram illustrating the format of the text displayed on the screen. The outer boundary of the FIG. 3*a* shows the limit of the screen as defined by the raster-scan or sweep of the electron beam on the screen. The swept image has "m" horizontal lines minus the number of lines occurring during the return of the beam and a frame rate of "s" frames per second. The outline labeled P.T. is the format of a page of text as displayed on the screen and includes $X_M$ columns of character boxes as well as $Y_N$ rows of character boxes. The text page may be moved electronically within the TV scan frame by an appropriate horizontal and vertical adjustment through a distance CDG.H and CDG.V respectively, by means to be explained below.

Figure 3B:
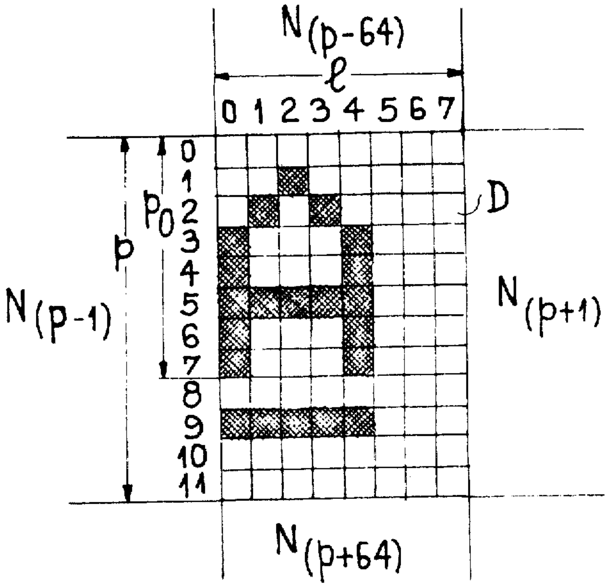

FIG. 3*b* is an enlarged diagram of a single character cell or box of order Np which is that occurring in the column $X_i$ and the row $Y_j$. As can be seen from FIG. 3, there are Y rows of character cells, each row having X cells. Each character box has 1 columns of dots D and p rows of dots. In other words, each character cell is comprised of 1.p dots. The dots are formed by the presence of the focused electron beam on the cathode ray tube. The various indices obey the following relations:

$$0 \leqq l \leqq l_M \quad o \leqq p \leqq p_N$$

$$0 \leqq X \leqq X_M \quad o \leqq Y \leqq Y_N$$

The number $N_p$ is given by $$N_p = (X_M + 1)\, Y_j + X_i$$

The value of the last character box N ($X_M$, $Y_N$) is $$N(X_M, Y_N) = (X_M + 1) Y_N + X_M$$

In the example chosen, $$l_M = 7,\ p_N = 11,\ X_M = 63,\ Y_N = 15$$

which corresponds to a page of displayed text having 1024 character boxes, each of the character boxes having 96 addressable dots, which can be inscribed at will by the cathode ray beam.

The format of each character is a 5×7 dot matrix having a total of 35 dots. The character boxes adjoin one another so that, in the chosen example, the horizontal distance between each character is equal to 3 dots and vertical separtion is equal to 5 dots. FIG. 3*b* shows an illustration of the letter A which is seen to occur between rows 1 and 7 while a writing cursor is a bar occurring on row 9 and having a length of 5 dots.

The total number of dots along the abscissa of each page of text is thus:

$$n_X = 8(X_M + 1) = 512 \text{ dots.}$$

The total number of dots along the ordinate of a page of text is:

$$n_y = 12(Y_n + 1) = 192 \text{ dots.}$$

The total number n of dots in a page is:

$$n = l_M + 8X_M + 512p_N + 6144Y_n = 98{,}304 \text{ dots.}$$

In the example shown, the number of horizontal lines on the television screen is m=315 while the number of images or frames per second s=50 Hz. In this type of application of the television sweep, it is unnecessary to interlace images of even and odd rows.

The intensity modulation of the cathode ray beam is binary, i.e. it is either on or off, and which level is chosen depends on whether the characters are to be black-on-white or white-on-black. The choice of modulation may also depend on whether a European or non-European TV standard is used.

FIG. 4 is an illustration of the manner in which the writing cursor appears. In the block A, the writing cursor is shown in place to write a new character. Normally, the cursor is positioned at the character box adjacent to the last letter written. In part B of the diagram, the cursor is shown at a later time. In this mode, the cursor alone blinks at some low frequency, for example 2 Hz. In part C, the cursor is shown in position for modifying or changing the character above. In that case, both the cursor and the character above it blink in opposite phase. In part D of the diagram, the writing cursor is shown at a later moment after the indicated character has been modified.

FIG. 5 illustrates the joining or concatenation of pages. In this diagram, the cathode ray tube is shown in the manner of a window which is continually moved over a roll of contiguous pages.

FIG. 6 illustrates the automatic scrolling of text at the end of a line (roll-up mode). When the end of a page is reached in this mode, the cursor is not returned to the top of the page but is maintained in block position on the last row of characters. In order to prevent that the new text is merely written on top of the old, the text rises progressively and the new rows of characters arrive from below while the upper rows of characters are normally erased. The upper rows of characters may be saved in memory if memory space is made available for them.

FIG. 6*a* illustrates the placement of information on the screen without scrolling while FIG. 6*b* indicates the appearance of information with scrolling.

The apparatus of the invention permits the partial or total erasure of characters in a page of text. When a row of characters is written on top of a row of characters already present, the new characters merely take the place of the old. However, if the length of the new row is shorter than that of the old, the remaining characters would be inappropriate. They may thus be blanked out either as a complete row or only as the end of the row. Furthermore, the entire page may be erased completely.

The detailed architecture and electronic components of the processor 7 and the various aspects of the invention will now be explained with the aid, firstly, of FIG. 7. The architecture of the processor includes two major parts. The portion generally at the lower part of FIG. 7 includes circuits for reading character codes into the character memory 100 and the circuits for displaying these characters on the cathode ray tube by means of the character generator 200.

The upper portion of FIG. 7 includes the circuits which inscribe the character codes in the storage memory and control circuits for executing commands specified by writing and erasure codes as well as codes for moving the writing cursor.

These two portions of the circuit function in time-shared mode at the TV line sweep rate, and are multiplexed by a multiplexing circuit 300 controlled by a signal INI.

The input data for the processor, furnished either by the keyboard or transmitted via the telephone line, are numerical signals corresponding to the character code or the control code. These signals (Sin) appear in parallel on 7 lines accompanied by a timing or "Strobe" signal STR which indicates the presence of a code word as either standard ASCII or EBDIC. These 7-bit code words are fed to a ROM-type memory which produces a 3-bit word ($C_0$, $C_1$, $C_2$) that specifies the writing mode. The input data is also directed to the character code memory; in the example shown, only 6 of 7 bits are retained for specifying the character code, thereby making available 64 different characters.

The character code memory 100 is a random access memory (RAM) of U pages each including 1024 6-bit words. The character code memory can be addressed at random and may be static or preferentially dynamic. The data entry to the character code memory is indicated by the reference letter W. Connected to the memory 100 is a blank operator circuit 150 which makes it possible to erase characters by inscribing blanks in their place.

The character generator 200 is a read-only memory (ROM) which generates 64 different characters each occupying a 5×7 dot frame in a 5×8 dot matrix, the first row of rank 000 being blank. The character codes are transferred from the memory in parallel, while the output of points $F_{(n)}$ to the video circuit takes place in series via a parallel-to-series converting register. This is accomplished by serializer register 201.

The processor operates on two time bases. The first time base is the dot display rate and the second time base is the TV sweep rate. The dot time base is generated by a clock $H_D$ which is pseudo-synchronous with the TV sweep rate. The clock $H_D$ has an oscillation frequency $F_D$ which can be adjusted so as to permit a change of the size of the displayed characters as well as the change of the right margin of text. The clock $H_D$ is pseudo-synchronized to the TV sweep rate by stopping the clock with the signal INI and releasing it by the horizontal framing pulse CDG.H.

The TV sweep rate is generated by a clock $H_O$ with continuous oscillation. The output frequency $F_O$ of the clock $H_O$ is divided in a set of coupled counters; the counter 510 generates synchronization pulses $S_H$ for the line sweep rate of the television receiver and the horizontal framing pulses CDG.H; the counter 520 generates the synchronization pulses $S_V$ for the frame rate of the television receiver as well as the vertical framing pulses CDG.V; the counter 530 generates the control signals $S_{CL}$ for erasing a row of characters and the counter 540 generates the control signals $S_{CS}$ for erasing the entire screen.

The address circuits for the character memory 100 and the character generator 200 are constituted by 4 counters: Y.CNT, X.CNT, p.CNT and 1.CNT. These circuits are coupled so that their total content permits addressing 98,304 dots. The counters 1.CNT and X.CNT correspond to the abscissa of a page of text and have a counting capacity of 512 units, i.e. they count modulo 512. They are incremented for each line of television display so that dynamic RAM memories may be used. The counters labeled p.CNT and Y.CNT correspond to the ordinate of a page of text and have a counting capacity of 192 units (they count modulo 192) and are incremented for each new TV frame. The circuits which generate the display address or the writing pointers which are used for addressing the character code memory 100 are made up by registers $PT_X$ and $PT_Y$ which are incremented by writing commands.

The writing circuits include a decoder circuit 600 which processes the writing command specified by the code word $C_0$, $C_1$, $C_2$. This circuit makes it possible to increment the writing pointer. The write control circuit 700 includes writing cycle generators which are under the control of the signal STR. This circuit generates simple codes such as writing a character into the code memory 100, incrementing the writing pointer so as to cause a movement of the writing cursor, and it also is capable of generating complex writing cycles such as those corresponding to the partial or total erasure of the screen either by command or automatically in the scrolling mode when the last row of displayed characters is erased.

A circuit which controls the operation of the writing cursor includes a 10-bit comparator 800 which generates a signal $PT_O$ whenever the contents of the display address circuit and the write address circuit are identical. The display signal PT of the writing cursor is subject to the contents of the counter p.CNT.

The processor further includes circuits 900 which permit generating the scrolling mode and the chaining together of pages of text.

FIG. 8 is an illustration of the time base generators, namely the television sweep rate and the rate at which displayed dots are positioned.

The television sweep rate clock $H_O$ includes an oscillator, preferably quartz-controlled, having an output frequency $F_O$ which is divided by counters CNT1, CNT2, CNT3 and CNT4 whose respective dividing ratios are 4, 16, 5 and 63. They are followed by a further counter CNT5 whose function will be explained later. The counter CNT2 has two outputs one of which carries the synchronization pulses $S_H$ of the television line frequency while the other carries the horizontal framing pulses CDG.H. The counter CNT4 also has two outputs, one of which generates the vertical synchronization pulses $S_V$ for the television framing frequency while the other carries the vertical positioning pulses CDG.V for a page of text. The synchronization pulses $S_H$ are applied to a previously mentioned counter CNT5 which is used to process the control signals for erasing displayed characters. The counter CNT5 has two outputs, an output $Q_5$ permitting a division of the $S_H$ pulses by a factor of 64 and an output $Q_9$ which performs a division of the pulses $S_H$ by a factor of 1,024.

The time base for writing the character dots includes a clock $H_D$ including an oscillator having an output frequency $F_D$ which is adjustable and can be made pseudo-synchronous with the TV sweep frequency $F_O$ by triggering the oscillation of the $F_D$ frequency by means of the horizontal framing pulses CDG.H. The $F_D$ oscillator is stopped by the end-of-row signal X.CNT. The framing pulses CDG.H and the end-of-line pulses are combined in a logical operator to form a signal INI which inhibits the dot clock $H_D$. At the same time, the signal INI is used for time multiplexing the read/display periods of the characters and the writing times for characters into the character memory. The duration of the signal INI is approximately a third of the period of the television line and the presence of this signal governs the character writing mode in the character memory.

FIG. 8b is an illustration of the waveform associated with the time base circuits. The horizontal synchronization pulses $S_H$ have a period equal to 64 $T_O$, $T_O$ being the period of the clock $H_O$. The vertical synchronization pulses $S_V$ have the period $T_V = mT_H$, where m is the number of television lines per frame, in this example being equal to 315. In a standard television receiver operating with a framing frequency of 50 Hz, the period $T_V$ is equal to 20 milliseconds.

The sawtooth sweep signals B.L and B.T (line and frame) of the cathode ray tube comprise an active period $T_A$ and a return period $\bar{T}_A$. The horizontal framing signals are delayed by a time $T_1$ with respect to the horizontal synchronization pulses $S_H$. The end-of-row signals X.CNT are produced after a period $T_c = 512\ T_D$, where $T_D$ is the period of the dot clock $H_D$ and the period $T_c$ corresponds to the read/display mode. The period $T_w$ corresponds to the time available for writing in the character code memory and is equal to $T_1 + T_2 + T_3$; it is controlled by the inhibit signal INI from the dot clock $H_D$. By studying the timing diagrams of FIG. 8b, it may be deduced that:

The time $T_p$ for displaying one page of characters equals 192 $T_H = 12,$ 228 $T_O$.

The duration of a frame of a television image equals 20,160 $T_O = 20$ ms.

The television sweep rate $F_O = 1/T_O = 1.008$ MHz while the television line period $T_H$ is approximately equal to 64 μs. The duration $T_c$ of the display of a row of characters equals $$T_c = T_H - (T_1 + T_2 + T_3)$$

where $T_3 = \bar{T}_A$ times the sweep return, i.e. approximately 12 μs. $T_1$ is approximately equal to $T_2$ and equal to approximately 5 μs so that the dot frequency $F_D$ is approximately equal to 12 MHz. The repetition rates of the signals $S_{CS}$ and $S_{CL}$ from the counter CNT5 are respectively equal to 64 and 4 milliseconds.

There will now be described the method for addressing the RAM memory in which the character codes are stored and the ROM memory for generating characters in the read/display mode.

Illustrated in FIG. 9 is a block diagram of the address circuits for the RAM memory 100 and the ROM memory 200. During a display cycle, the cathode ray sequentially traverses all n dots in a page of text, i.e. n goes from 0 to 98,303. To perform this sweep, there are disposed 4 sequential counters of the following characteristics:

A 3-bit modulo 8 counter 1CNT whose address outputs are $L_0$, $L_1$ and $L_2$;

A 6-bit modulo 64 counter C.CNT whose address outputs are $A_0$ to $A_5$;

A 4-bit modulo 12 counter pCNT whose address outputs are $R_0$, $R_1$, $R_2$; and A 4-bit modulo 16 counter Y.CNT whose address outputs are $A_6$ through $A_9$.

These counters are clocked at the rate of the pulses $CK_D$ delivered by the dot clock $H_D$. These counters are chained together in such a way that the maximum count in a counter triggers the incrementation of the following counter.

Figure 9A:
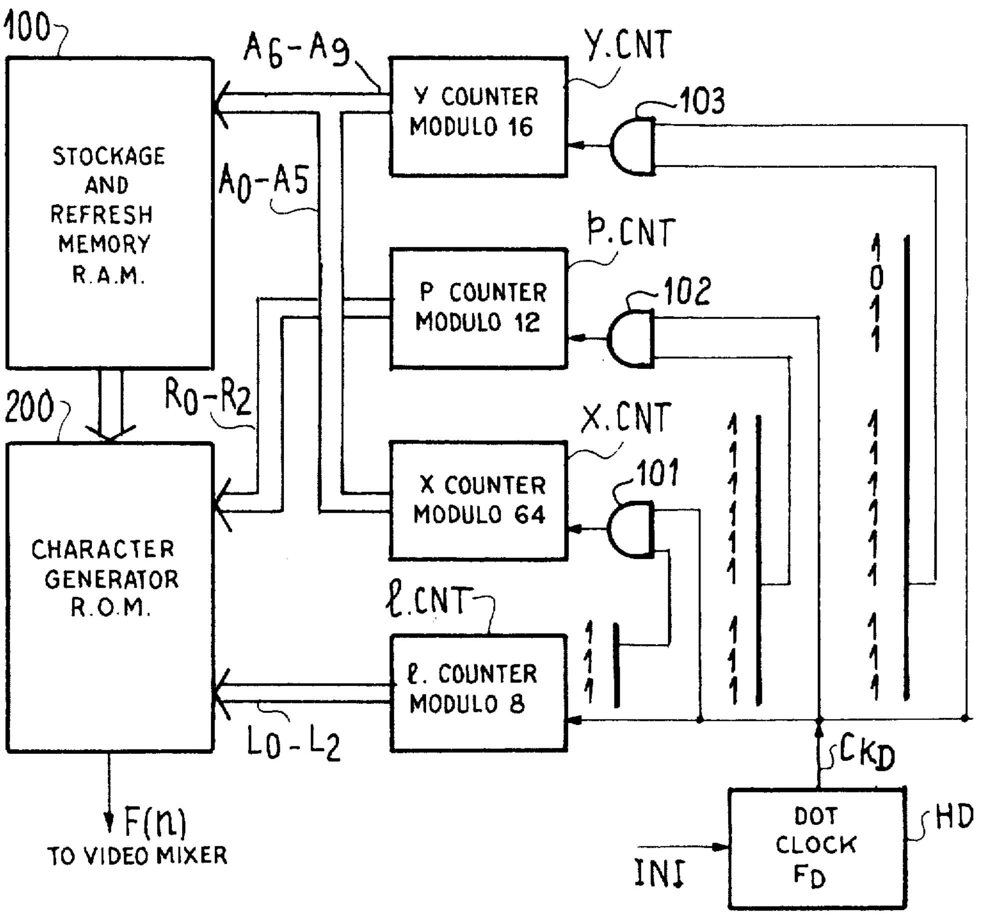
Figure 9C:
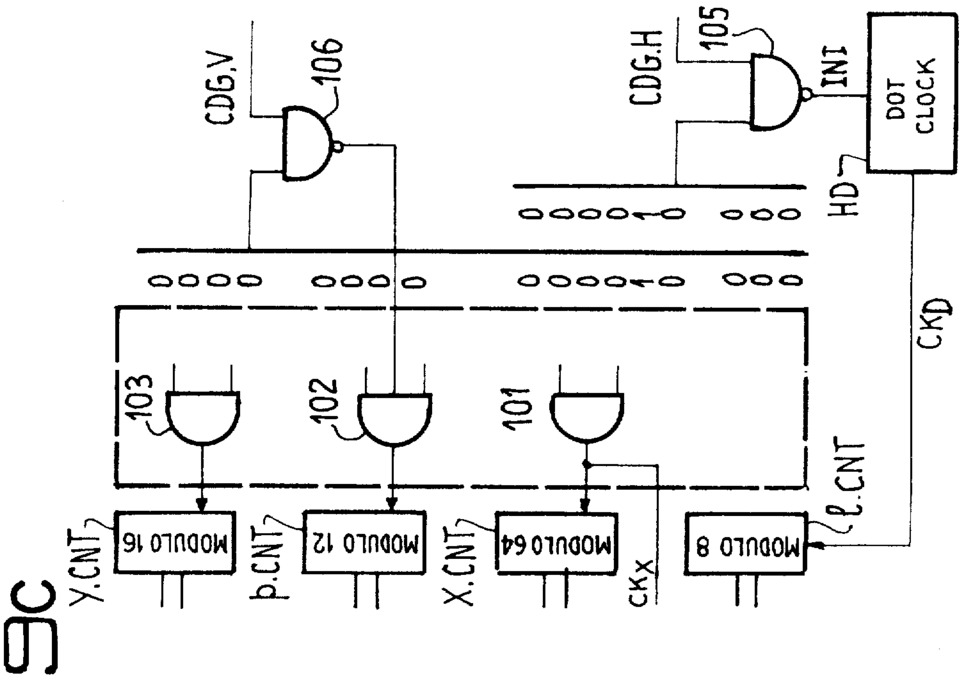
Figure 9B:
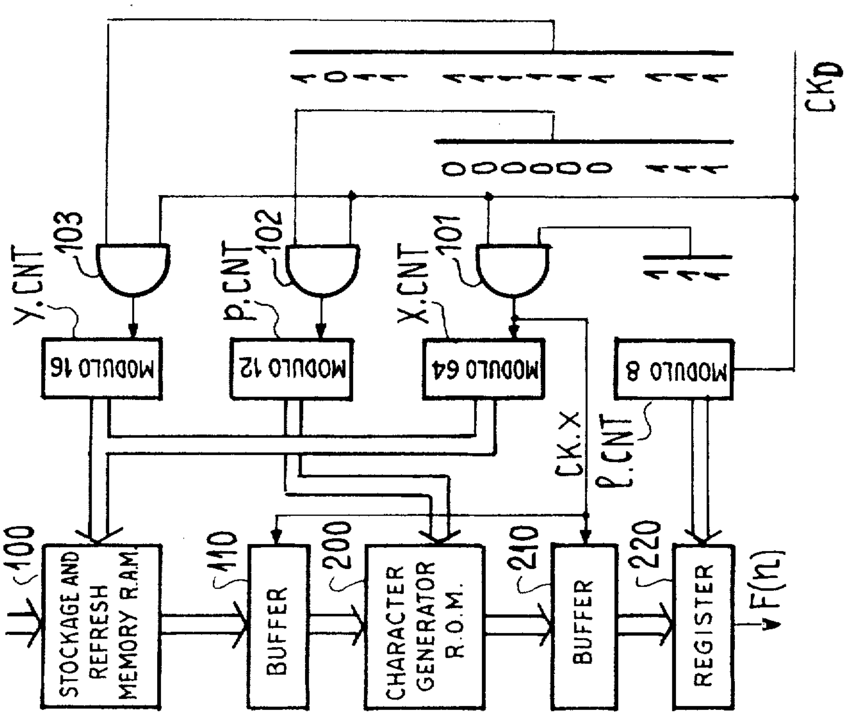

The organization of the various memories and address circuits such as shown in FIG. 9a is based on a consideration of different time delays in transmission or execution, for example the access time of the RAM memory 100, the signal traversal time in the ROM memory 200 and the time for selecting the 5×12 matrix of a character box. When presently available circuit components are used, these delays are greater than 0.8 μs. In order to overcome this limitation, there are inserted two buffer or latch registers 110 and 210 as shown in FIG. 9b. The buffer 110 is placed between the RAM 100 and the ROM 200 while the buffer register 210 is placed between the character generator ROM and the parallel-to-series converting register 220 which is addressed by the counter 1.CNT. The two buffer registers 110 and 210 are addressed by the incrementation pulses for the counter X.CNT. These registers are filled a short time prior to the modification of the data, i.e. prior to the incrementation of the X.CNT counter.

The coupling together of the display counters as shown in FIG. 9b eliminates the effect of the various time delays.

The counter block is incremented in synchronism with the TV time base. When dealing with the horizontal display of character dots, the counter block must be incremented by 512 units for each line of dots. For this purpose, the dot clock $H_D$ is started in synchronism with the synchronization pulses $S_H$ or, more exactly, with the horizontal framing pulses CDG.H which indicate the beginning of a new row of characters in a page of text. The clock $H_D$ is stopped when the counters have been incremented by 512 units and the circuit for controlling the dot clock $H_D$ is illustrated in FIG. 9c. A logical operator, for example a flip-flop or a gate, is triggered by the pulses CDG.H and reset when the counters 1.CNT and X.CNT have received 512 incrementations corresponding to a content of (512+16)=16 units due to the effect of transfer delays in the memories as indicated previously. The output of the gate delivers a signal INI which inhibits the clock $H_D$ and will also be used at the same time for initiating the writing mode.

Figures 9D, 9E:
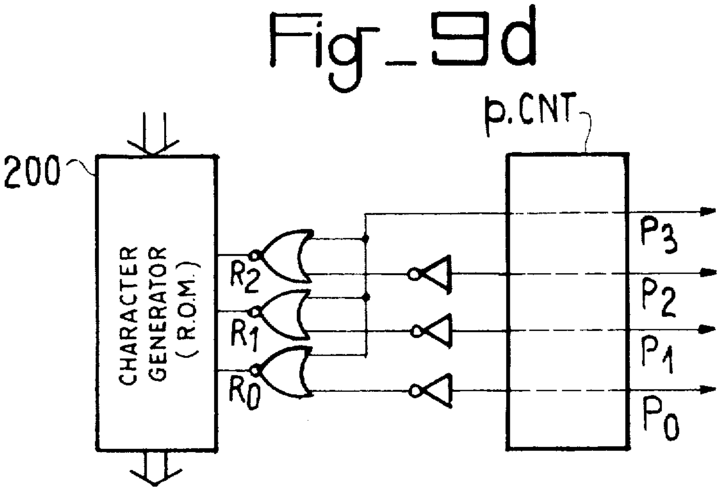

The vertical synchronization may be generated in a similar manner to the horizontal one, however it is preferable to proceed differently so as to permit the use of a character storage memory of the dynamic RAM type. If the dot clock $H_D$ is inhibited, the RAM memory could not be addressed during approximately 8 milliseconds which would be an excessive amount of time for a dynamic RAM memory which requires a refreshment of the 64 columns every two milliseconds. The addressing of rows in the RAM memory may be stopped by inhibiting the input incrementation of the counter p.CNT at the end of a page of text until the moment when the vertical framing pulse CDG.V arrives as shown in FIG. 9c. The output signals of the counter p.CNT which are used to address the character generator ROM 200 must be adapted to the particular type of memory. If, for example, the ROM has 5 columns of dots and 8 rows of dots, with the first row of rank 0 not being used, and if it is desired to obtain a vertical separation of 5 dots between characters, a logical interface circuit must be inserted between the p.CNT counter and the ROM memory 200. A circuit of this type is shown in FIG. 9d. The input signals $P_0$–$P_2$ from the counter p.CNT are inverted and applied to one of the input lines of NOR gates whereas the other input of these gates receives the signal $p_3$. The output signals $R_0$–$R_2$ of these gates are then applied to the address inputs of the ROM 200 while the signals $p_0$–$p_5$ are applied to the status input of the p.CNT counter. A table as illustrated in FIG. 9*e* shows the diagram of the sequence of addresses.

It has been seen that the state of the display address counters must be recognized and for this purpose there must be deployed recognition elements. These status recognition elements may be gates which use the Boolean sum of the counter outputs. A different method based on temporal recognition is shown in FIG. 10. In order to produce a circuit that recognizes the value K of a counter which counts modulo N, with $0 \leqq K \leqq N$, one may use a Boolean recognition circuit for the value K' and reduce that value by a quantity (K−K') modulo N. By way of example, the outputs of a modulo 16 counter are shown incremented by a signal S and supply the inputs of an AND gate 2 feeding a sequence of flip-flops 3 which are clocked by the same signal S which sequentially retards the output of the gate 2.

There will now be described the circuits which permit the upward shift of a page of text, i.e. to produce the function of the terminal in the scrolling or roll-up mode. In the previous configurations of chaining together the display address counters, each character box of rank $N_p$ is stored in the address code memory. In order to operate in the roll-up mode, the rows of characters must be able to be displaced upwardly on the cathode ray screen.

One method for obtaining this upward movement is to submit the incrementation of the p.CNT counter and the Y.CNT counter to a register whose content is equal to the number of the last row of characters to be inscribed.

Figure 11A:
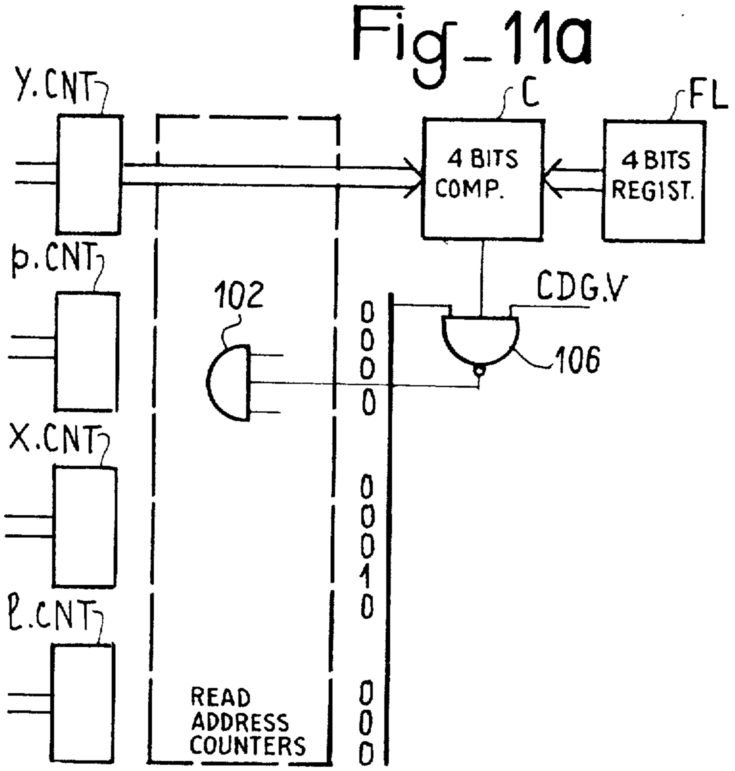

FIG. 11*a* illustrates an exemplary circuit for thus incrementing the counters p.CNT and Y.CNT. The output of a register FL whose content K ($0 \leqq K \leqq Y_N$) is compared in a comparator C with the content of the counter Y.CNT. It will be noted that, when the content of the register FL is all ones (1111), the previous configuration is restored.

Figure 11B:
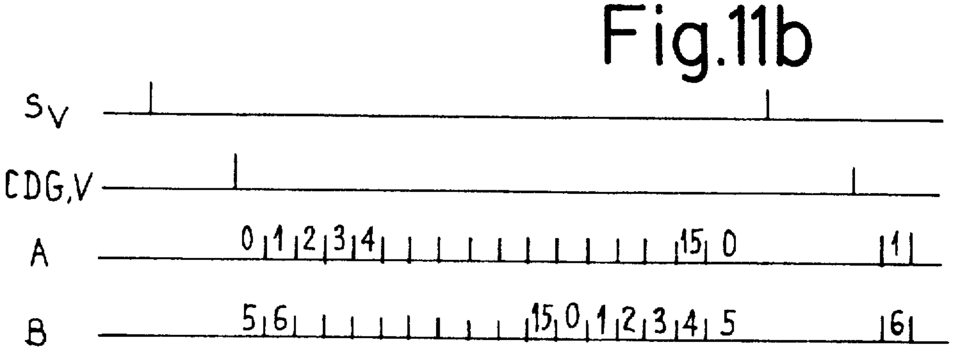

FIG. 11*b* is a timing diagram of the sequences associated with the roll-up mode; the diagram A illustrating conditions when the contents of the register FL are 15 units, and in B when the contents of the register FL are 4 units.

The contents of the register FL are modified in connection with the writing mode which will be developed ultimately. The partial description of the elements which constitute the processing block for the addresses of writing/display of characters makes it possible to establish the complete block diagram for this circuit as represented in FIG. 12.

There will now be described the means for writing characters and first of all the means for addressing the character code RAM memory 100. The addressing circuits are shown in simplified manner in FIG. 13 and are constituted by a writing pointer consisting of two chained registers, $PT_X$ and $PT_Y$ with a total capacity of 10 bits, whose content shows the address of the next character to be written in the RAM memory to be displayed consecutively. A writing operation thus involves an inscription or a writing into the character code memory 100 and thereafter the modification of the contents of the writing pointer. A writing operation depends on the presence of the STROBE signal STR which is a service signal that validates the character code received, the nature of the operation being specified by the 3-bit word $C_0$, $C_1$, $C_2$ or by the writing code. These writing circuits are active only during a time period when the inhibit signal INI for the dot clock $H_D$ is present. The address words coming from the registers $PT_X$ and $PT_Y$ are multiplexed in time by the multiplexer 300 which is controlled by the inhibit signal INI. The writing operation specified by the writing code $C_0$, $C_1$, $C_2$ may be divided into two classes: one class which has only a simple cycle and which is executed during the presence of the inhibit signal INI and another class which includes complex cycles executed during several periods of the presence of the inhibit signal INI.

A writing operation in a simple cycle will involve:

The eventual inscription of a word of character code in the RAM memory,

And/or a displacement of the writing cursor (+1, −1, +64, −64) corresponding respectively to a displacement to the right, to the left or up or down by one row of characters.

In FIG. 14*a* are illustrated the elements which are necessary for executing a simple cycle; they include, for example, three flip-flops S, W, P of the master-slave type, wherein the slave portion of the flip-flop copies the status of the master flip-flop if the clock input is low. With the aid of the flip-flop W, the horizontal synchronization sweep signal $S_H$ samples the output signal $Q_S$ of a flip-flop S which is set by the signal STR. The output signal $W_0$ of the flip-flop W authorizes a write operation as specified by the writing code $C_0$, $C_1$, $C_2$. The output $Q_W$ of the flip-flop P is sampled by the signal $S_H$ thereby generating a signal CK.W which increments the writing pointer $PT_X$, $PT_Y$ and resets the flip-flops W and S. The flip-flop P is reset by the horizontal framing signal CDG.H which thus completes a simple cycle. Depending on the writing code $C_0$, $C_1$, $C_2$, either the character to be displayed is written in the RAM memory or the writing pointer is incremented.

FIG. 14*b* is a timing diagram of the signals generated by the circuits of FIG. 14*a*. The leading edge of the signal $S_H$ clocks the flip-flop W while the trailing edge clocks the flip-flop P. The leading edge of the signal CDG.H clears the flip-flop P and thus concludes a simple write cycle.

The complex cycles are also conditioned by the presence of the strobe signal STR, and they include:

Resetting the writing pointer to 0, writing in the character code memory RAM 1,024 blank characters so as to erase all of the characters in that memory and thus to generate a blank page of characters on the cathode ray screen;

Writing 64 blanks in the RAM memory without changing the content of the writing address register $PT_Y$ so as to erase one whole row of characters;

Incrementing the contents of the writing address register $PT_X$ and writing blanks in the RAM memory until the instant when the contents of the $PT_X$ register correspond to the return of the writing cursor to the beginning of a row of characters.

The elements for performing complex writing cycles are illustrated in FIG. 15. It has previously been shown that the input $D_W$ of the flip-flop W, if at high level, permits generating a write cycle at the rate of the line sweep signal $S_H$ of the TV screen. If the high level of the D input of the flip-flop W is maintained during a predetermined time which is a function of the number of characters or of blanks to be inscribed, it is possible to produce complex cycles. For this purpose, the signals $S_{CS}$ and $S_{CL}$ generated by the time base of the television sweep synchronization are used, the duration of the signals $S_{CS}$ and $S_{CL}$ being, respectively, 1,024 and 64 times as long as the repetition period $T_H$ of the horizontal synchronization signal $S_H$. It should be noted that for complex cycles, it is necessary to inscribe blank characters in the RAM memory and that the inscription of each character requires generating a simple writing cycle. It may also be noted that during the erasure of one row of characters and the erasure of the end of a row of characters, it is necessary to inhibit the effect of the register $PT_X$ on the register $PT_Y$ so as to prevent any change of the row of the writing cursor.

The foregoing considerations are related to the circuit diagram for a complex cycle as represented in FIG. 15. During a complex cycle, a high level signal should be present at one of the D entries of the flip-flops $RC_1$, $CL_1$, and $CL_2$. The arrival of a strobe signal STR then starts a simple write cycle and the signal $CK_W$ memorizes the corresponding command in one of the flip-flops. If the operation specified by the writing code $C_0$, $C_1$, $C_2$ is an erasure of the remaining part of a row of characters, then the flip-flop $RC_2$ is forced high until the time when the content of the register $PT_X$ of the writing pointer is 0. For this purpose, the content of the writing register $PT_X$ is detected and applied to the input CK of the flip-flop $RC_2$. During the entire cycle, the output signal $\overline{PB}$ of the OR gate 401 is applied to an operator 402 which forces the code $C_0$, $C_1$, $C_2$ to the normal character writing code and at the same time it is also applied to an operator 150 placed above the character code memory 100 and forces the character code to be a blank.

The two other complex cycles function in the same way with the exception that the flip-flops CL2 and EL2 which correspond to the writing codes of erasure of a page and erasure of a row of characters are maintained at a high level until the appearance of the second increasing, i.e. leading, edge of the signals $S_{CS}$ and $S_{CL}$. It will also be noted that the insertion of an AND gate between the $PT_X$ and $PT_Y$ registers makes it possible to inhibit the communication of the $PT_X$ register with the $PT_Y$ register during the duration of the complex cycles "erasure of a row of characters" and "erasure of the remainder of a row of characters".

The element 405 is a decoder matrix which translates the code word for the various operational orders in the manner tabulated in the following table:

| $C_2\ C_1\ C_0$ | Operations Code |
|---|---|
| 0 0 0 | Erase page |
| 0 0 1 | Erase end of row of characters |
| 0 1 0 | Lower by one line |
| 0 1 1 | Inhibit character sent |
| 1 0 0 | Return cursor |
| 1 0 1 | Erase or transfer row |
| 1 1 0 | Raise by one line |
| 1 1 1 | Normal character |

There will now follow a description of those elements which serve to display the writing cursor and these elements are illustrated in a schematic diagram in FIG. 16. The circuit for generating the writing cursor includes a 10-bit comparator 800 which compares the contents of the writing pointer constituted by the registers $PT_X$ and $PT_Y$ with the contents of the display address counters X.CNT and Y.CNT, it being kept in mind that the contents of the writing pointer correspond to the address of the next character to be inscribed and that the writing cursor is represented on the cathode ray screen by a horizontal bar of a length of 5 dots which appears on the line of 9th rank in the dot matrix of a character box. The write cursor is displayed during the display phase by forcing the input to the buffer register to a logical 1. The output signal $PT_0$ of the comparator 800 is retarded by one incremental period of the counter C.CNT because of the presence of the buffer register 210, and this operation is performed by a flip-flop 810 which is controlled by the pulses $CK_X$ which increment the counter p.CNT.

Next to be described are the elements for insuring the operating mode in which text is scrolled or rolled up on the screen and these elements are presented in FIG. 17. The roll-up mode requires the FL register and this register contains the number of the last line below the page of text, the content of the register FL being between 0 and 15. Thus, in order to obtain the roll-up mode, it is sufficient to increment the FL register at the same time as the upper part $PT_Y$ of the writing pointer. The comparison between the contents of the FL register and the upper part $PT_Y$ of the writing pointer is performed by the comparator C which has a capacity of 4 bits. Subsequent to the incrementation of the FL register, the new last line displayed corresponds to the oldest previous line of text. This line is generally composed of character codes so that it must be erased or blanked out so that the lines which appear from the bottom of the cathode ray screen are continuously free of characters as if they came from a roll of paper. To achieve this effect, a line erasure cycle is automatically started when the FL register is incremented. For this purpose, the flip-flop EL1 which registers a line erasure command is interfaced with an OR gate 601. When the control code "screen erasure" arrives, this order is registered in the flip-flop CL1 and subsequently by the flip-flop CL2, at the same time as the contents of the writing pointer are annulled (RAZ) and the register FL is forced to assume the code "1111" which corresponds to the row of characters of the 15th rank.

It will now be described how several pages are chained together in the character code memory.

When the processor functions in the scrolling or roll-up mode, it may be desirable to save those parts of the text which have been written. This may be done by installing a storage memory having a capacity of $U \times 1{,}024$ words of 6-bits, organized in $U = 2^n$ pages. Thus, means must be provided for writing and reading a page of rank $U_p$. One way to perform the chaining together of pages is shown in FIG. 18*a*. A page counter U.CNT which shows the rank of a page being processed is incremented by the output RP of the register FL. The address of the actual page will be deduced from its value diminished by one unit or not, depending on whether one is located at the bottom of the preceding page, i.e. the top of the screen, or the top of the new page, i.e. the bottom of the screen, the deduction being made by comparing the address "row of the character box" with the value of the contents of the register FL. An adder ADD is inserted in the page address bus of the character code memory 100; this adder is controlled by the signal RS coming from the comparator C. The signal RS is at a low logical level when the displayed part of the page of text belongs to the preceding page and the signal RS is at a high logical level if the part of the page of text being displayed belongs to the top of the current page.

In the illustration of FIG. 18*b*, the diagram A represents the position of the cathode ray screen on the linked pages of text and in diagram B there is shown the corresponding position of the rows of character boxes on the screen. The manner of chaining or linking together the pages of text is shown in FIG. 18c in a timing diagram for the rows of character boxes with respect, on one hand, to the vertical synchronization pulses of the television scan and, on the other hand, with respect to the sequence of pages $U_i$, of rank $U_p$ and $U_{p-1}$. The capacity of the text-linking circuit described above is limited only by the size and cost of the character code memory 100.

It has previously been shown that the operation of the roll-up mode required two address comparators: a first comparator between the register FL and the address of the rows of displayed characters which permits stopping the display when the last row of characters is being displayed on the screen and a second comparator between the register FL and the writing address so as to know when it is proper to increment the register FL. It is possible to join these two comparators in a single comparator by time-multiplexing the display and writing addresses. However, when the writing causes an incrementation of the FL register, it is possible that a parasitic line can appear at the bottom of the TV screen although only during the first scan. In order to eliminate this phenomenon, one must double the size of the register FL; the first register $FL_V$ is used for display while the second is used for writing as shown in FIG. 19. The contents of the register $FL_V$ are modified only at the beginning of the vertical sweep which is the phase during which the display means are inhibited and to this effect the vertical synchronization pulses $S_V$ for the television scan are applied to the register $FL_V$. The registers FL and $FL_V$ are multiplexed by the multiplexer 350 whose output is compared in the comparator C which also receives the address bus for the character code memory 100.

The manner of integrating the above-described processor in an LSI configuration (large scale integration) will now be discussed. Any large scale integration of a circuit is subject to various constraints: The maximum number of input/output lines of a circuit, the maximum capacity of the integrable components on the silicon wafer, the upper operational frequency, various non-integrable components, the flexibility of usage of the device, the number of power supply sources, etc. In the present case, it appears reasonable to limit the number of input/output lines to a standard 28 lines, the next higher standard value being 40 lines for commercially made circuits. If it is desired to keep the processor as flexible as possible in its application, the character code memory, the character generator and the control generators cannot be integrated into the single circuit. Furthermore, the memory circuits are easily available in the commercial market. For this reason, the input data bus connected to the character code memory and to the identification memory for control codes leads to the placement of the blanking operator for character codes on the outside of the integrated circuit. Given that the operational frequency of the dot clock $H_D$ of the display counter 1.CNT is higher than 10 MHz, these elements are also advantageously disposed externally of the integrated circuit. The page-linking circuit whose capacity depends on the desired application should also be placed outside of the integrated circuit as should the quartz crystal which controls the frequency stability of the TV sweep clock $H_0$.

In order to permit limiting the number of lines of the integrated circuit to 28, it is suitable to multiplex certain ones of the input/output signals which are temporally orthogonal, for example the signal $\overline{PB}$ which is used to force the character codes to be blank during an erasure of the characters in a write cycle may be multiplexed with the address signal $R_2$ of the ROM character generator which is used only during the display period and the inhibition signal INI may be used for this purpose.

FIG. 20 illustrates the manner of interconnecting the processor module and the associated elements which together constitute the processor assembly. The assignment of the various input/output buses is recapitulated hereinafter.

| Signal | Number of bus | |
|---|---|---|
| $A_0$–$A_4$ | 18 to 22 | Addresses for the character code memory. |
| $A_5$–$A_9$ | 8 to 4 | Addresses delivered by the X.CNT counter which counts continuously so as to permit the possible refreshment of the dynamic RAM memory. The memory cycle should be lower than 500 ns. |
| $R_0$–$R_2$ | 11 to 13 | Addresses of the "line" portion of the character generator ROM 200. The line 000 must be blank for all characters and the access time of the ROM must be less than 600 ns. The address signal $R_2$ is multiplexed with the control signal PB. |
| PT | 15 | The writing cursor signal furnished to the character generator ROM.. |
| $C_0$–$C_2$ | 23 to 25 | Input lines for the writing code, the character write code, the displacement of the cursor, and erasure (see table page 36). |
| STR | 16 | Validation signal for writing codes. |
| W | 17 | Signal for writing in the character code memory 100. |
| CK.1 | 9 | Incrementation signal for the counters X.CNT, p.CNT and Y.CNT. |
| INI | | Inhibition output signal for the dot clock $H_D$, duration approximately 20 μs, repetition period 64 μs. |
| $Q_i$–$Q_0$ | 1 to 2 | Connections to the quartz crystal of the television sweep clock $H_0$. |
| SYNC | 26 | Multiplex synchronization TV signals $S_H$ and $S_V$. |
| R.P | 27 | Incrementation signal for the page counter. |
| R.S | 3 | Identification of the displayed page whether preceding or current page. |
| VSS | 14 | +5 V power supply. |
| VDD | 28 | Ground. |

For example, a processor of this type may be integrated in N—MOS technology in a silicon matrix.

The description of the invention will now be concluded by giving an example of an application in which a processor is integrated on a silicon wafer encapsulated in an integrated circuit having 28 lines similar to that described above. The processor and its associated components are shown in a functional block diagram in FIG. 21. This processor permits a display of four pages of text of 1024 characters of 6-bits each, and using a dynamic RAM storage memory and a character generator ROM capable of generating an alphabet of 64 characters. The integrated circuit portion J is connected to a number of associated circuits which may for example be of the following general commercially available type:

A-B-C-D-E-F, dynamic RAM memories of type 2107 B marketed by the firm INTEL.

G, a buffer stage, for example the integrated circuit 74174 marketed by THOMSON-CSF, Division SESCOSEM.

H, a ROM character generator of the type RO-3-2513 marketed by GENERAL INSTRUMENTS.

I, a parallel-to-series converter of the type 74165 marketed by THOMSON-CSF, Division SESCOSEM.

K, a counter of the type DM 8556 marketed by NATIONAL SEMICONDUCTORS.

L, a ROM of type 71301 marketed by THOMSON-CSF, Division SESCOSEM.

M, an adder of the type 7483 marketed by THOMSON-CSF, Division SESCOSEM.

N, a register of the type 74193 marketed by THOMSON-CSF, Division SESCOSEM.

O, a NAND gate of the type 7400 marketed by THOMSON-CSF, Division SESCOSEM.

P, an operating circuit of the type SFC.5452 marketed by THOMSON-CSF, Division SESCOSEM.

Q, an integrated circuit of the type 74132 marketed by THOMSON-CSF, Division SESCOSEM.

R, an inverter of the type 7404 marketed by THOMSON-CSF, Division SESCOSEM.

S, a UART of the type AY-5-1013 marketed by A.M.I.

T, a clock of type MC 14411 marketed by MOTOROLA.

U, gates of the type MC 1488 marketed by MOTOROLA.

V, gates of the type MC 1489 marketed by MOTOROLA.

W, an NPN transistor of type 2 N 2222 used as the multiplexing stage for the character dots and the synchronization pulses $S_V$ and $S_H$ for the television scan.

It will be appreciated that the list of particular integrated circuit elements given above is entirely exemplary and that similar circuits produced by other commercial firms would be entirely satisfactory.

Similarly, the various examples of the circuits shown to accomplish the functions described, the numerical values of principal parameters and the general nomenclature of elements within the description are entirely exemplary. In particular, the format of the text pages could be altered, both with respect to the number of rows of character boxes as with respect to the number of columns of characters. The scan characteristics of the television receiver may be adapted to various standards. The capacity of the character code RAM memory is entirely dictated by the intended operational conditions. The prior programming of the operational decoder ROM may be altered to either increase or decrease the facilities that use the system.

One of the principal applications of the processor according to the present invention is in constituting a video communication terminal which may be used to conduct a dialogue between a computer and a person. If the computer itself is located near the video terminal, the telephone and associated components may be eliminated, for example in local control applications in control consoles and the like, i.e. wherever a person communicates directly with a computer. A video terminal of the type described in the present invention may advantageously take the place of a teletypewriter.

The particular advantages provided by the present invention which are of considerable significance with respect to the prior art are, among others, the cadence with which characters are written into memory, the manner in which the size of the characters displayed is controllable, the capability of using a character code memory of several pages with the employment of linked dynamic RAMS, and the architecture of the various circuits in such a way as to permit large scale integration. The processor according to the present invention and the video terminal which it controls have a great flexibility of use, permitting their adaptation to only that level required by the intended tasks.

The foregoing relates to preferred exemplary embodiments of the invention, it being understood that other embodiments and variants thereof are possible within the spirit and scope of the invention.

What is claimed and desired to be secured by Letters Patent of the United States is:

1. A digital processor connected between a data bus and a conventional TV set having a CRT screen and a scanning means, said TV set operating according to a raster-scan system of m lines per frame and s frames per second, said digital processor permitting the display, in the form of discrete dots having a time base for writing, on the CRT screen, a page of alphanumeric characters having an alphabet of $2^N$ characters, a page of characters being composed of Y rows of character cells, each row being composed of X character cells, each character cell being composed of a matrix of l by p dots, and a writing cursor indicating the position of the next character which is to be inscribed, said digital processor including, a ROM for decoding input instruction codes which enters said ROM, said ROM having: inputs connected to the data bus which carries said input instruction codes, and outputs;

an N-bits blanking operator, said blanking operator having: N inputs connected to the data bus, N outputs and one blank command input connection;

a REFRESH RAM connected for storing data representing said alphanumeric characters, said REFRESH RAM having a capacity of at least one page of X by Y words of N bits and having N data inputs connected to the N outputs of said blanking operator, and an input means for addressing said character cells, a Read/Write command input and N outputs;

an N-bits latch register, said register having N inputs connected to said N outputs of said REFRESH RAM, N outputs and a load command input connection;

a character ROM for generating $2^N$ distinct characters, said character ROM having data inputs connected to said latch register, a scanning means for scanning said character cells; the character ROM also having outputs equal in number to or less than the value L;

a serializer register having inputs connected to said character ROM, a second load command input connection, a shift command input and an output connected to the TV set;

a package containing a semiconductor microchip comprising the following LSI circuits:

a timing generator which permits the synchronization of the TV set scanning means and of the other LSI circuits of said semiconductor microchip, this generator comprising: a clock signal source of fixed frequency which increments a first counter including a decoder which provides TV line SYNC top-signals and pulse signals for horizontal centering of the page of displayed characters and a second counter including a decoder which provides TV frame SYNC top-signals and pulse signals for vertical centering of the page of displayed characters;

an address signal generator comprising: a command circuit which generates a command signal; a clock signals source which generates clock signals at a frequency equal to the time base of the dots, said clock signals source connected to the command circuit to be disabled by the command signal, the address signal generator also comprising four linked counters including decoders which are incremented by the clock signals source; these connectors being: one modulo-L counter, one modulo-X counter, one modulo-P counter, one modulo-Y counter, an output of said counter modulo-L also being connected to the shift command input of said serializer register, the output of said modulo-L counter being connected to the first load command input of said latch register and the second load command of said serializer register, the outputs of the modulo-P counter being connected to the character ROM inputs means for scanning said character cells; the command circuit of the dot clock circuit including: a first input which receives said signals for horizontal centering and a second input connected to the output of said modulo-X counter decoder, the incrementation of the modulo-P counter being enabled by said pulse signals for vertical centering;

a writing address pointer with outputs connected to said REFRESH RAM, comprising an X-bits register linked through an inhibiting gate to a Y-bits register;

a first multiplexer comprising a first input connected to the outputs of said writing address pointer and a second input connected to outputs of the modulo-X and modulo-Y counters and also comprising (X+Y) outputs connected to the addressing means of said REFRESH RAM, and a command input connected to receive said command signal;

a decoding operator connected to said character ROM for decoding via a forcing operator means, said forcing operator means including a command input, said decoding operator being connected to generate command inputs to said writing address pointer;

a writing generator connected to operate in synchronism with the TV line SYNC top-signals, said writing generator connected to the Read/Write command input of said REFRESH RAM and connected to provide an input to the writing address pointer;

an erase generator for clearing an end of a row, a row, or a page of characters, said erase generator including inputs connected to said decoding operator, an output connected to the inhibiting gate of said writing address pointer, an output connected to the blank command input of said blanking operator and the command input of said forcing operators;

a writing cursor generator including: a comparator of (X+Y) bits with inputs connected respectively to the outputs of said writing pointer and the outputs of said modulo-X and modulo-Y counter; and an inhibiting gate connected to receive the output of the writing cursor generator and to receive the outputs of said modulo-P counter and to generate a signal indicative thereof to the writing cursor.

2. A digital processor in accordance with claim 1, wherein the clock signals source of said address signal generator includes means for permitting the modification of its frequency.

3. A digital processor in accordance with claim 1, wherein said REFRESH RAM data is of the dynamic type.

4. A digital processor in accordance with claim 1, wherein said TV set is a "home TV receiver" type having an RF modulator.

5. A digital processor in accordance with claim 1, wherein said TV set is of the TV monitor type having a video input.

6. A digital processor in accordance with claim 1, wherein said timing generator for synchronization is a quartz-stabilized oscillator.

7. A digital processor in accordance with claim 1, including a modulo-XY counter connected to be incremented by the TV line SYNC top-signals, said XY counter furnishing a first signal for synchronization of the erase generator for erasing a row of characters and a second signal for erasing a page of text.

8. A digital processor in accordance with claim 1, wherein said clock signal source and the modulo-L counter of said address signal generator are disposed on the exterior of said LSI case.

9. A digital processor in accordance claim 1, including a decoding operator between the outputs of said modulo-P counter and the inputs of the scanning means of said character ROM.

10. A digital processor in accordance with claim 1, wherein the decoder of said modulo-Y counter is a programmable decoder controlled by the output signals of the Y bits register of the said writing address pointer in order to provide a roll-up function.

11. A digital processor in accordance with claim 1, wherein said erase generator includes a first circuit for erasing an end of a row of characters, a second circuit for erasing a complete row of characters and a third circuit for erasing a complete page of text, wherein the output of the first, second, and third erasing circuits are connected to an OR gate whose output is connected to the blank command input of said blanking operator and the command input of said forcing operators.

12. A digital processor in accordance with claim 11, wherein the output of the first and second erasing circuits are connected to a logic gate of the OR type whose output is connected to the input of the inhibiting gate included in said writing address pointer.

13. A digital processor in accordance with claim 1, wherein said modulo-Y counter of said address signal generator includes a programmable decoder including a further register for ranking the character rows, said further register being incremented by the output signal of a comparator which is connected between said further register and the Y bits register of said writing address pointer.

14. A digital processor in accordance with claim 13, wherein said character RAM comprises U pages of memory of X by Y words of N bits, said pages being linked by a means of linkage including, connected in series, a page counter indicating the page actually at hand, said page counter being incremented by a report output of said further register for the rows of characters, and a subtractor controlled by the output of said comparator.

15. A digital processor in accordance with claim 1 including roll-up means for the page of alphanumeric characters, said roll-up means connected to the Y outputs of said first multiplexer and connected to the output of a further multiplexer including a control input connected to receive the command signal of the command circuit, a first register including an incrementation input connected to the output of said comparator and a second register including a load command input which receives the TV frame SYNC top-signals, the output of the first register being connected to an input of said first multiplexer and to the input of the second register, the output of the second register being connected to the other input of said first multiplexer.

* * * * *